(12) United States Patent
Bonar et al.

(10) Patent No.: US 10,645,092 B1
(45) Date of Patent: May 5, 2020

(54) CONTROL AND/OR VERIFICATION OF INTERACTIONS OF AN AUGMENTED REALITY DEPLOYMENT

(71) Applicants: Jonathan Bonar, Vancouver (CA); James Hursthouse, West Vancouver (CA)

(72) Inventors: Jonathan Bonar, Vancouver (CA); James Hursthouse, West Vancouver (CA)

(73) Assignee: TRULY SOCIAL GAMES LLC, Salem, OR (US)

( * ) Notice: Subject to any disclaimer, the term of this patent is extended or adjusted under 35 U.S.C. 154(b) by 0 days.

(21) Appl. No.: 16/238,994

(22) Filed: Jan. 3, 2019

(51) Int. Cl.
*H04L 29/06* (2006.01)
*G06T 11/60* (2006.01)
*G06K 9/00* (2006.01)
*G06F 16/51* (2019.01)

(52) U.S. Cl.
CPC ............ *H04L 63/107* (2013.01); *G06F 16/51* (2019.01); *G06K 9/00671* (2013.01); *G06T 11/60* (2013.01)

(58) Field of Classification Search
CPC .................................................. G06T 19/006
See application file for complete search history.

(56) References Cited

U.S. PATENT DOCUMENTS

| | | | |
|---|---|---|---|
| 2013/0014169 A1* | 1/2013 | Sansom | H04N 7/17318 725/48 |
| 2014/0247279 A1* | 9/2014 | Nicholas | G06T 19/006 345/633 |
| 2017/0004382 A1* | 1/2017 | Inoue | G06T 19/006 |
| 2017/0124765 A1* | 5/2017 | Imamura | H04N 5/272 |
| 2018/0197624 A1* | 7/2018 | Robaina | A61B 3/0041 |
| 2018/0309942 A1* | 10/2018 | Matsumura | H04N 5/355 |
| 2019/0114061 A1* | 4/2019 | Daniels | G06F 3/04815 |

\* cited by examiner

Primary Examiner — Phi Hoang
(74) Attorney, Agent, or Firm — Jensen-Haxel Law

(57) ABSTRACT

Disclosed is a method, a device, and a system of control of and/or verification of interactions of an augmented reality deployment. In one embodiment, a method includes delivering an augment image associated with an augment marker to a computing device through a screen through which the physical environment of the augment marker is viewable. An augment request extracts a geospatial coordinate data of the computing device. In response to a determination within a geospatial boundary and a display limit is below a threshold value, an authorization token permits the computing device to display the augment image positioned relative to the augment marker according to a display parameter data. An augment record may include the capture image of the augment marker and compared to a second augment request. A match may then be determined which may indicated a falsified instance of the augment request and an error data generated.

20 Claims, 15 Drawing Sheets

CONTROL AND/OR VERIFICATION OF INTERACTIONS OF AN AUGMENTED REALITY DEPLOYMENT

FIELD OF TECHNOLOGY

This disclosure relates generally to a data processing device and, more particularly, to a method, a device and a system of control and/or verification of interactions with an augmented reality deployment.

BACKGROUND

Augmented reality (AR) includes an interactive experience where a real-world environment and/or object is "augmented" by computer-generated perceptual information, sometimes across multiple sensory modalities, visual, auditory, and haptic. For example, a user can point a device (e.g., a smartphone) at a certain object (e.g., a 2D image on a poster, a 2D video displaying on a monitor, a 3D object) that when detected signals the device to augment the experience by displaying something on a screen, playing a sound through a speaker, or causing vibrations through a motor of the device. For example, with the correct smartphone application, a user smartphone could be used to detect a trigger or marker, such as on a graphic embedded in a music band's promotional t-shirt, and overlay on the smartphone's display a moving graphic that augments the physical t-shirt design viewable trough the display. The first wave of AR development may have primarily focused on getting the technology to function. Such developments have focused on, for example, the complex interactions of associating a physical environment and/or object with an augment, consistently having the augment work, and then providing an exciting or useful augmented experience to a user.

Augmented reality may represent a huge commercial opportunity, including in the areas of entertainment, advertising, education, commerce, industry (e.g., guiding a working to make repairs and recognize equipment components), and transportation (e.g., augmented reality windshields in cars permitting better interpretation of road conditions, obstacles, navigation, etc.).

Despite these opportunities, there still may be significant challenges for AR. Some employing organizations such as companies, educational institutions, governments, or other types of organization may wish to deploy many coordinating instances across several locations and/or objects for a large advertising campaign, sponsored event, an/or educational experience. They may have difficulty defining individual augments into a coordinated plan that meets their intended purpose, which may limit the scope of the physical world and/or reality that can be augmented. Especially when used for games and promotions, the deploying organization may find it difficult to define fun and exciting experiences where they may have limited capability to define or control the AR deployment. For some AR deployments, especially which may require large data files, the user may either have to know ahead of time which files to download or the deploying organization may have to guess which data files may be relevant to the user. This may lead to wasted memory and bandwidth, or where the augment file is requested on-demand at the time the marker is detected, may lead to a delay or faulty experience where the file is large and/or connectivity of a network is poor.

Similarly, because the AR deployment may have a tie to the physical world (e.g., the physical environment including the marker that initiates the augment), the deploying organization may wish to provide the augmented experience (an any reward that comes with participation) only to users who truly visit the physical environment and/or engage in the experience. For example, where a marker that initiates an augment is a mural and the first ten people to visit are to receive a prize, a user may be able to find a photo on the internet that can be placed in front of the device to falsify presence at the physical environment of the marker, playing the augment and submitting for the prize. In its lease concerning aspect, this may diminish the experience of a contest. On the other hand, where the prize may be large (e.g., a new automobile) this may be a significant risk to the deploying organization.

Thus, an opportunity remains for an improved capability for an augmented reality deployment, from stand-along deployments of a single marker and augment to potentially massive AR deployments requiring high certainty that users actually interacted with and/or were within the physical environment specified by the deploying organization. As a result, the deploying organization may only be able to define a reduced reality for augmentation, have a limited ability to change and/or control the deployment, and little or no ability to verify a user's interaction with the intended physical environment. The result may be reduced user engagement, diminished user experience, lost revenue, and/or even fraud.

SUMMARY

Disclosed are a method, a device and a system of control and/or verification of interactions with an augmented reality deployment. In one embodiment, a method of controlling an augmented reality deployment includes delivering an augment image associated with an augment marker, the augment image to be displayed on a display of a computing device that includes a screen displaying a physical environment of the augment marker and/or a transparency screen through which the physical environment of the augment marker is viewable. An augment request to display the augment image on the display of the computing device is received. The augment image request generated by the computing device through at least three processes. First, the augment marker is scanned with a camera of the computing device and/or a scanner of the computing device to generate a capture image of the augment marker or a scan data, respectively. Second, the process extracts from the computing device a geospatial coordinate data specifying a geospatial coordinate of the computing device.

The method then determines that the capture image of the augment marker and/or the scan data matches an exemplar data of the augment marker stored in a memory of the computing device. The exemplar data is associated with a marker ID. An authorization token is generated in response to the determination that the geospatial coordinate of the geospatial coordinate data is within a geospatial boundary and a timestamp of the augment request is within a time range. The authorization token permits the computing device to run computer executable instructions that when executed on a processor of the computing device display the augment image on the display of the computing device positioned relative to the augment marker according to a display parameter data.

The method may receive the marker ID, the scan data, and/or the capture image of the augment marker as data included in the augment request. The timestamp of the augment request may be generated, and it may be determined that a value of a display limit in a database is positive. A request lock on one of the number value may be initiated, and the authorization token may be generated in response to the determination that the value of the display limit in the database is positive. An augment confirmation data may be received (e.g., by a server) and the value of the display limit in the database may be decremented.

The method may determine that the display limit in the database is below a threshold value. A new instance of the augment image may be associated with the marker ID. The method may transmit the new instance of the augment image to the computing device automatically upon determining that the display limit in the database is below the threshold value, and/or transmit the new instance of the augment image to the computing device upon submission of the augment request, wherein the augment request further includes an augment ID.

The method may deliver the new instance of the augment image while the computing device is continuously displaying the augment image on the display of the computing device. An augment update instruction may be delivered specifying termination of the augment image on the display of the computing device and initiating display of the new augment image on the display of the computing device.

The method may receive a location signature data generated based on a location signature and generating at least one of a timestamp of a generation of the location signature data and a timestamp of a receipt of the location signature data. The location signature data may be verified to be associated with at least one of the marker ID and the physical location of the augment marker. The location signature may be changed to a new instance of the location signature in response to submission of the location signature data.

The scan data and/or the capture image of the augment marker may be transmitted as data included in the augment request. An augment record may be stored that includes the scan data and/or the capture image of the augment marker in a request record database. A second augment request including a second instance of the capture image of the augment marker may be received. The second instance of the capture image of the augment marker may be compared to each other instance of the capture image of the augment marker in the request record database. A match may then be determined between the capture image of the augment marker submitted in the augment request and the capture image of the augment marker submitted in the second instance of the augment request. An error data may then be generated (e.g., indicating the scan data and/or the capture image had already been submitted in association with the augment request).

A second geospatial coordinate data of the computing device may be received. The method may then calculate a geospatial radius around the computing device and determining the augment marker is within the geospatial radius, and/or determine the computing device is within an augment zone associated with the augment marker. It may be determined that the augment image is associated with the augment marker. It may then be determined that the augment marker that is within the geospatial radius and/or within the augment zone prior to generation of the augment request. Finally, an occurrence of a specified augment event may be determined, and a second instance of the time range associated the marker ID and/or the augment ID may be initiated.

In another embodiment, a method of controlling an augmented reality deployment includes receiving an augment image associated with an augment marker, the augment image to be displayed on a display of a computing device. The computing device includes a screen displaying a physical environment of the augment marker and/or a transparency screen through which the physical environment of the augment marker is viewable. The augment marker is scanned with a camera of the computing device and/or a scanner of the computing device to generate a capture image of the augment marker and/or a scan data, respectively.

The method determines the capture image of the augment marker and/or the scan data matches an exemplar data of the augment marker stored in a memory of the computing device. The exemplar data is associated with a marker ID. From the computing device is extracted a geospatial coordinate data specifying a geospatial coordinate of the computing device. An augment request to display the augment image on a display of the computing device is submitted. An authorization token is received, generated in response to the determination that the geospatial coordinate of the geospatial coordinate data is within a geospatial boundary. The augment image is positioned relative to the augment marker on the display of the computing device according to a display parameter data, and the augment image is then displayed on the display.

In yet another embodiment, a system comprises a control server and a network. The control server includes a processor of the control server and a memory of the control server. The control server includes a zone detection agent that includes computer readable instructions stored in the memory of the control server that when executed on the processor of the control server (i) receive a geospatial coordinate data of a computing device, (ii) calculate a geospatial distance around the computing device and determining a augment marker is within the geospatial distance, calculate the geospatial distance around the augment marker and determining the computing device is within the geospatial distance, and/or determine the computing device is within an augment zone associated with the augment marker; (iii) determine an augment image associated with the augment marker; and (iv) transmit the augment marker that is at least one of within the geospatial distance and within the augment zone at least one of in response to generation of an augment request and prior to generation of the augment request.

The system includes a marker recognition system that includes computer readable instructions stored in the memory of the control server that when executed on the processor of the control server determine the a capture image of the augment marker and/or a scan data of the augment marker matches an exemplar data of the augment marker stored in a memory, where the exemplar data is associated with a marker ID.

The system further includes a request verification module that includes computer readable instructions stored in the memory of the control server that when executed on the processor of the control server generates an authorization token in response to the determination that a geospatial coordinate of the geospatial coordinate data is within a geospatial boundary. The and verification module further determines a timestamp of the augment request is within a time range. The authorization token permits the computing device to run computer executable instructions that when executed on a processor of the computing device display the augment image on the display of the computing device positioned relative to the augment marker according to a display parameter data.

The system also includes a request uniqueness validation routine that includes computer readable instructions stored in the memory of a delivery server that when executed on the processor of the delivery server: (i) transmit the scan data and/or the capture image of the augment marker as data comprising the augment request; (ii) store an augment record that includes the scan data and/or the capture image of the augment marker in a request record database; (iii) receive a second augment request that includes a second instance of the capture image of the augment marker; (iv) compare the second instance of the capture image of the augment marker to each other instance of the capture image of the augment marker in the request record database; (v) determine a match between the capture image of the augment marker submitted in the augment request and the capture image of the augment marker submitted in the second instance of the augment request; and (vi) generate an error data.

The system may further include a delivery server that may include an augment delivery engine, a zone detection agent, and/or an augment transition engine. The system may include the computing device, where the computing device includes a geospatial transmission module and/or an augment execution engine. The system may include a location authentication device.

Other features of the present embodiments will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device, a system and/or a manufacture of control and/or verification of interactions of an augmented reality deployment. Although the present embodiments have been described with reference to specific example embodiments, it will be evident that various modifications and changes may be made to these embodiments without departing from the broader spirit and scope of the various embodiments.

Figure 1:
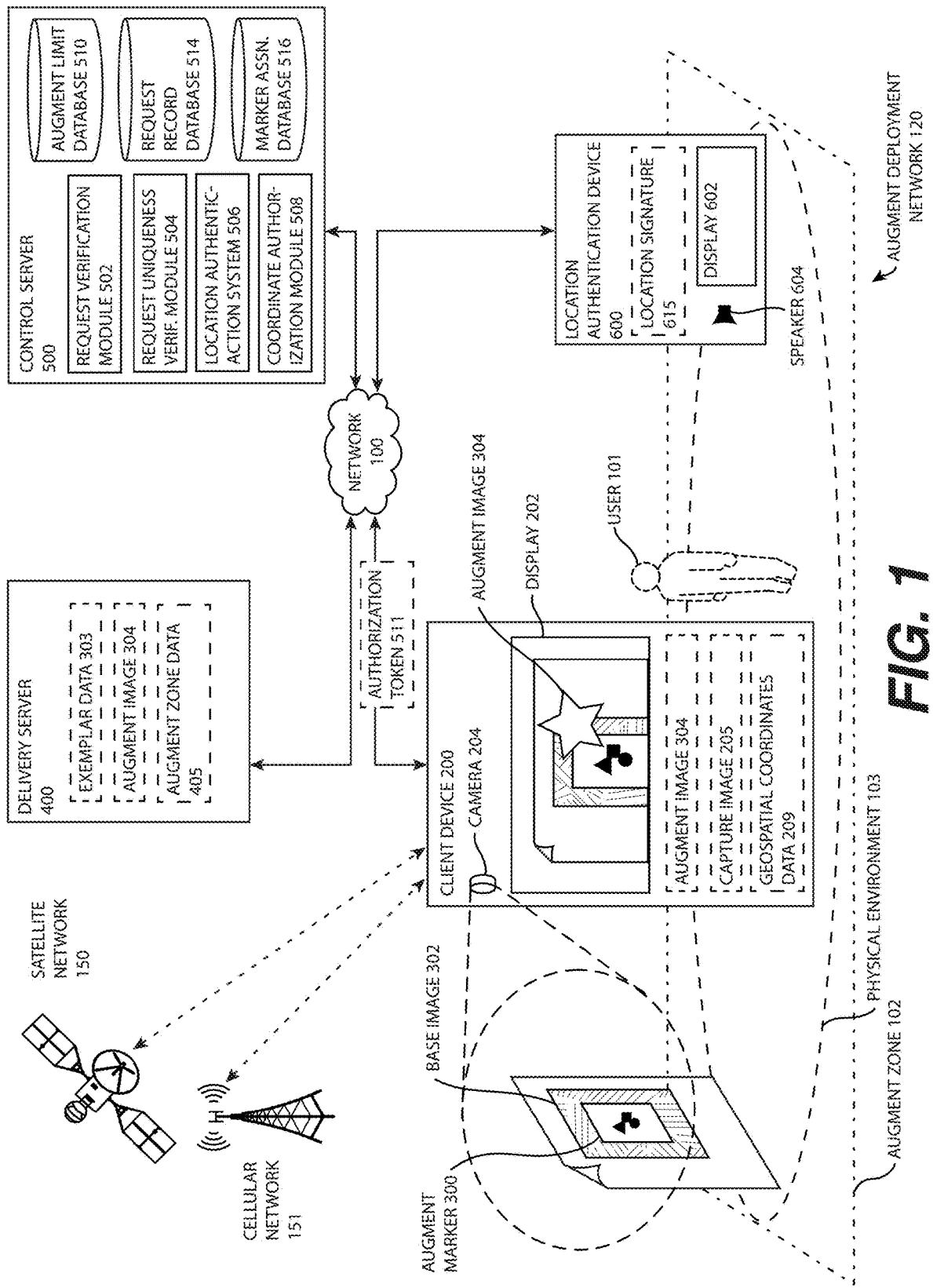
FIG. 1 is an augment deployment network comprising a delivery server supplying an augment to a computing device (e.g., a smartphone), a control server for controlling the augment and/or an augment marker associated with the augment and verifying and authorizing augment requests of the computing device, a base image within a physical environment including the augment marker to be scanned by the computing device for initiation of the augment request, and a location authentication device for verifying the augment request of the user within the physical environment, according to one or more embodiments.
Figure 3:
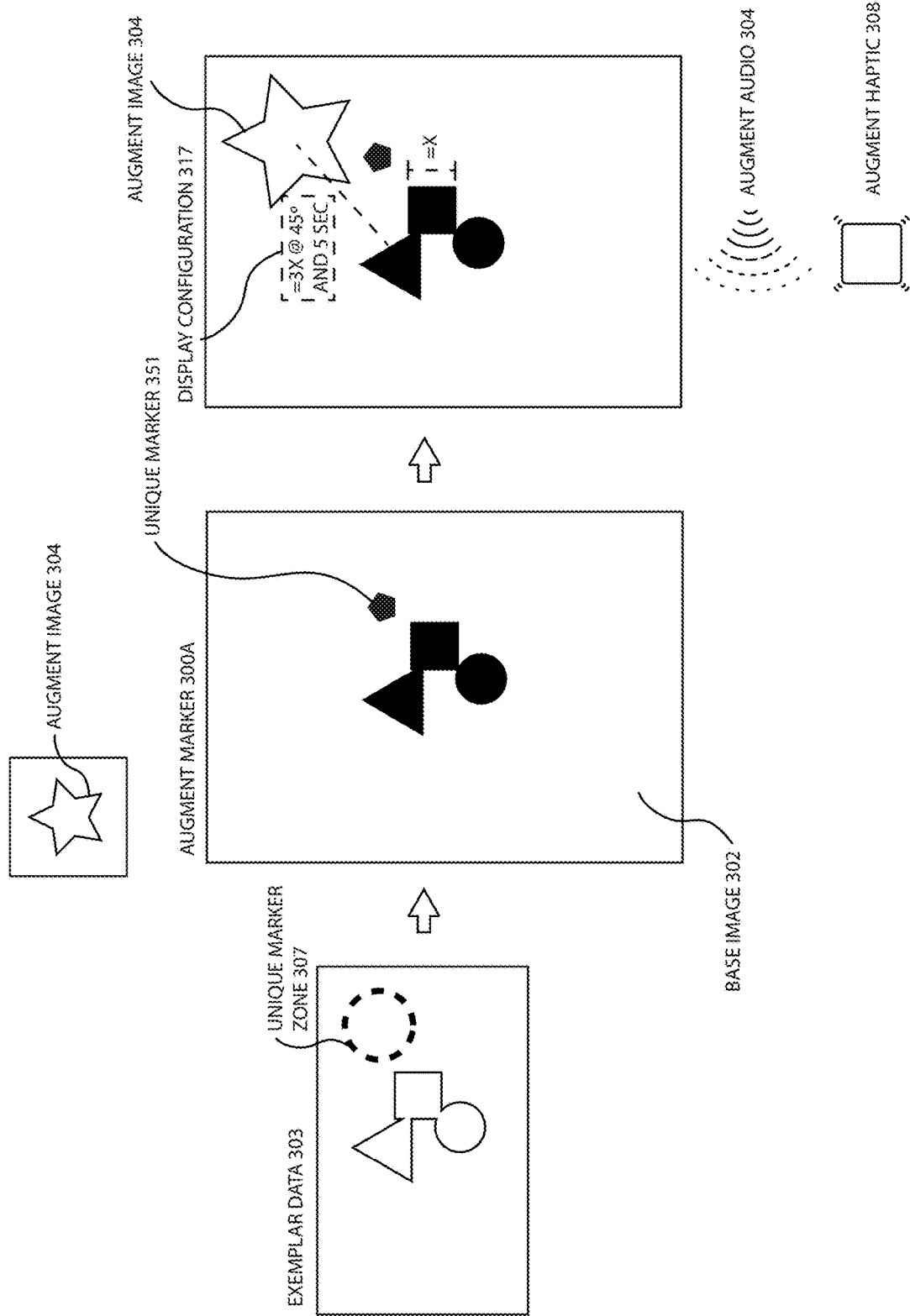
FIG. 3 illustrates a graphical instance of the augment marker of FIG. 1 comparing a capture image to an exemplar data and, upon detection and any authorization, presentation of an augment image displayed on the display of the computing device according to a display configuration and optionally in conjunction with an augment audio and/or augment haptic, according to one or more embodiments.

FIG. 1 illustrates an augment deployment network 120 for controlling an augmented reality deployment and/or verifying interactions, transactions, and/or augment requests of the augmented reality deployment. A user 101 utilizes the computing device 200 to detect an augment marker 300 within a physical environment 103. The augment marker 300, shown and described in detail in conjunction with FIG. 3, is a detectable element that is associated with one or more augments to be presented to the user. For example, the augment marker 300 may be an image that can be recognized by comparison to an exemplar data 303, an image that may encode data in a visual protocol (e.g., a QR code), and/or a beacon that can be detected by near-field communication or Bluetooth (e.g., via a wireless communication interface 222). Upon identification of the augment marker 300, the computing device 200 may generate an augment request 104 to initiate the augment for the user 101 and the associated augment can be initiated and presented to the user 101, either on the computing device 200 or another associated computing device. For example, the computing device 200 may utilize a camera 204 to generate a capture image 205 that can be compared to an exemplar data 303, either on the computing device 200 or a server computer, as described below. The augment may be a sound, image, and/or haptic perceptible in relation to the physical environment 103 by the user 101 through the computing device 200 or another computing device (e.g., a smartwatch, a VR headset through which the physical environment 103 is visible during user, a pair of smart glasses). The physical environment 103 of the augment marker 300 may be an physical space in which the augment marker 300 is placed and any augments may be experienced where the augment marker 300 is detectable by the computing device 200. For example, the physical environment 103 may a short distance from a t-shirt bearing the augment marker 300 (e.g., 20 feet), may be a room in an art gallery where the augment marker 300 is a painting, or may be a larger outdoor area (e.g., 5 acres) in view of a Jumbotron displaying or otherwise presenting (e.g., playing a sound of) the augment marker 300.

The augment request 104 may be communicated through the network 100 (e.g., a wide area network, the internet, an intranet, a local area network, the cellular network 151, and/or a satellite network 150) to the delivery server 400 and/or the control server 500. The delivery server 400, which may be a server computer running as one or more nodes of a content delivery network, may transmit the augment (e.g., an augment image 304) to the computing device 200 through the network 100. The control server 500 may determine display limits, time limits, geospatial limits, and/or other constraints associated with the augment requested in the augment request 104 stored in an augment limit database 510.

The control server 500 upon a positive determination may issue an authorization token 511 initiating the augment on the computing device 200 and/or transmit data required to complete the augment. Before issuance of the authorization token 511, the control server 500 may verify a location of the computing device 200 through analysis of the geospatial coordinates data 209 generated by the computing device 200 and/or through verification of a location signature 615 displayed and/or otherwise distributed through an authentication device 600 within the physical environment 103 of the augment marker 300. The location signature 615 may be presented on the authentication device 600 through an out-of-band channel of the network 100, validating the user 101 and/or the computing device 200 is present within the physical environment 103, as shown and described in conjunction with FIG. 6 and FIG. 13.

In another means of verification, the control server 500 may utilize a request uniqueness verification module 504 to store each augment request 104 and an associated capture image 205 such that each subsequent instance of the capture image 205 can be checked through several means against each other instance of the capture image 205 to detect an non-genuine instance of an augment request 104, e.g., one that was not generated at the physical environment 103 associated with the augment marker 300.

In an additional aspect of the embodiment of FIG. 1 an augment zone 102 can be detected to improve performance and/or security of the augmented reality deployment. The computing device 200 may transmit the geospatial coordinate data 209 to the delivery server 400 which may be compared to the augment zone data 405 which may specify a given zone (e.g., the augment zone 102) in which one or more augment markers 300 are defined. When the computing device 200 enters the augment zone 102 and transmits geospatial coordinate data 209 indicating such entry, the delivery server 400 may trigger the download of one or more instances of the exemplar data 303, the marker ID 301, the augment image 304, and/or the augment ID 305. Detection of the augment marker 300 at an instance of the physical environment 103 within the augment 102 may then occur, resulting in generation of the augment request 104. Where the computing device 200 has already downloaded the augment (e.g., the augment image 304 from the delivery server 400), the augment may be able to be initiated (e.g., displayed on the display 202) quickly following recognition of the augment marker 300. This may be in contrast to waiting for download of the augment, especially if a data file of the augment is large and/or connectivity through the network 100 is limited.

Through the augment deployment network 120, a deploying organization can therefore, in addition to other capabilities described herein: define augment zones 102 which upon entry by a computing device 200 initiates delivery of relevant augment data to the user; associate augment markers with augments, including automatic re-associations upon set conditions; detect multiple attempted submissions of similar instances of the augment request 104; and/or verify an augment request 104 is actually generated form a physical environment 103 associated with the augment marker 300, using one of several means including high-certainty out-of-band location authentication through the location authentication device 600. The augment deployment network 120 is therefore usable to coordinate large-scale, dynamic, time-sensitive, and high-stakes events and competitions sponsored by an organization such as a corporation, non-profit organization, government, or other type of organization.

Figure 2:
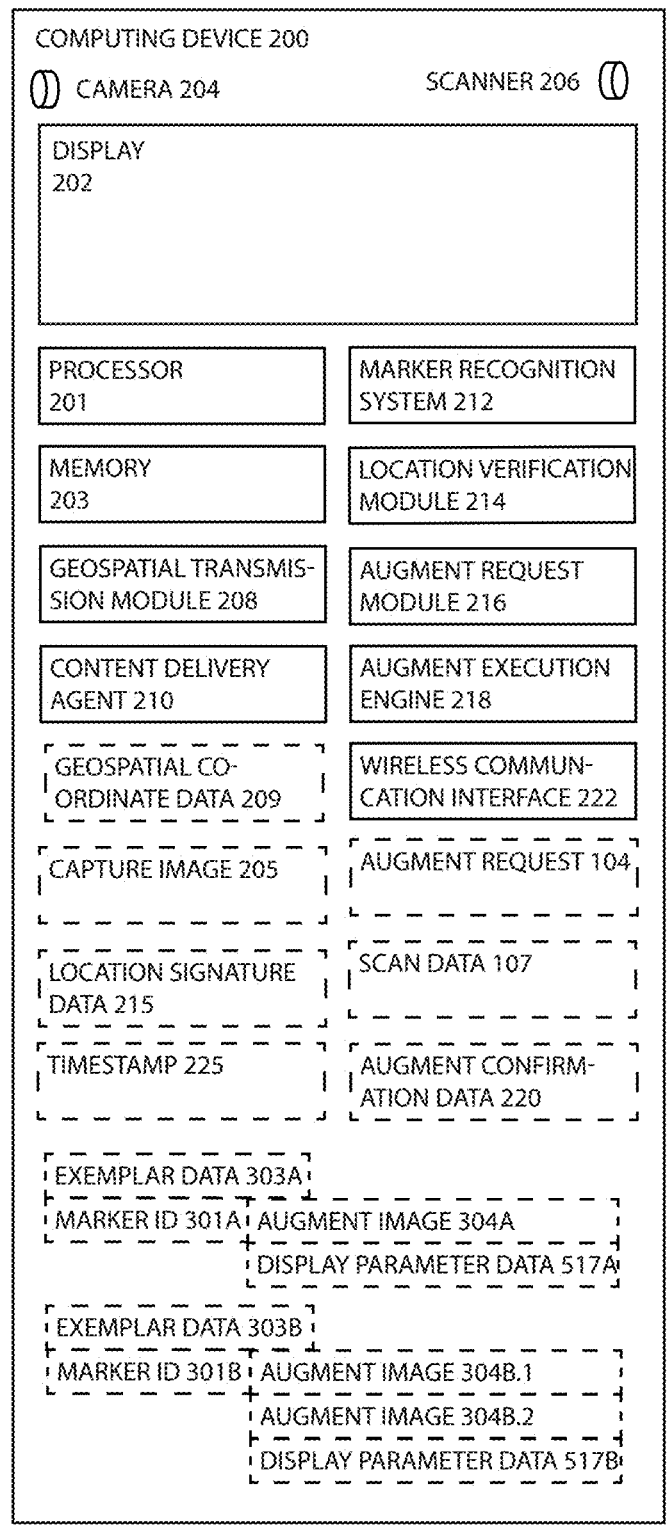
FIG. 2 illustrates the computing device of FIG. 1 used to detect the augment marker and present the augment to the user, the computing device including a display, a camera and/or scanner for generating a capture data (e.g., a capture image and/or a scan data) for detecting the augment marker, a geospatial transmission module, a content delivery agent, a marker recognition system, a location verification module, and an augment execution engine, according to one or more embodiments.

FIG. 2 is the computing device of FIG. 1 through which the user 101 detects one or more augment markers 300, initiates the augment request 104, and/or presents the augment (e.g., the augment image 304) to the user 101 (e.g., on the display 202), which may occur in coordination and communication with one or more of the servers of the augment deployment network 120. The computing device 200 includes a processor 201 and a memory 203 (e.g., RAM, solid state memory, SATA, a hard disk, etc.) In one or more embodiments, the computing device 200 may be a mobile device, a smartphone (e.g., an iPhone), a tablet (e.g., an iPad), a notebook computer, and/or a gaming device (e.g., Nintendo® Switch). The computing device 200 includes equipment usable to detect an augment marker 102. In the embodiment of FIG. 2, the computing device 200 is configured to utilize the camera 204 and/or the scanner 206 to detect instances of the augment marker 300. The scanner 206 may be a barcode and/or a QR code scanner. The camera 204 may be a standard smartphone camera usable to generate a capture image 205 sufficient to recognize the augment marker 300 that is an image marker (e.g., an iPhone 6 camera, an iPhone 8 camera, a Google Pixel 3 camera, a 5 mega pixel camera, a 15 mega pixel camera, etc.). The camera 204 and/or the scanner 206 may be incorporated into or detachable from the computing device 200. The capture image 205 is an image captured by the camera 204 (which may for example be a capture image 205 of the augment marker 300), and the scan data 207 comprises data captured by the scanner 206. The capture image 205 and/or the scan data 207 may undergo a number of filtering processes. For example, a capture image 205 of a QR code may be automatically converted using a QR protocol to alphanumeric characters.

The computing device 200 may include a display 202 through which the physical environment 103 is visible and an augment image 304 can be displayed (e.g., overlayed). The display may be a screen (e.g., an LCD screen, and LED screen, and/or OLED screen) and other 2-dimensional array display technologies. The display 202 may also be a 3-dimensional display (e.g., holographic display, swept-volume display, light field display, laser display, etc.). The display 202 may also be a transparency display such as a transparent glass or plastic capable of overlaying the augment image 304 (e.g., Microsoft HoloLens®, Magic Leap®, Google Glass®, etc.).

The geospatial transmission module 208 comprises computer readable instructions that when executed on the processor 201 causes the processor 201 to transmit upon predetermined conditions a geospatial coordinate data 209 of the computing device 200 to one or more of the servers of FIG. 1. The geospatial coordinate data 209 may be obtained by means of the satellite network 150 (e.g., GPS, GLONASS), the cellular network 151, and/or other means. In one or more embodiments, the geospatial coordinate data 209 is initiated at periodic intervals (e.g., every second, every 30 seconds, every hour, once per day). In one or more embodiments, the geospatial coordinate data 209 is initiated upon certain conditions, such as the computing device 200 being turned on or entering a new geospatial area as detected on the computing device 200. In one or more embodiments, the computing device 200 may store a set of geospatial coordinates that, when it is determined on the computing device 200 to be within a certain distance, initiate transmission of the geospatial coordinate data 209.

The content delivery agent 210 comprises computer readable instructions that when executed on the processor 201 causes the processor 201 to accept incoming data for immediate use (e.g., as a response to an augment request 104) and/or for anticipated use within the augment zone 102. The data received by the content delivery agent 210 may include instances of augments (e.g., the augment image 304), the exemplar data 303, the display parameter data 517, the marker ID 301, and/or the augment ID 305. Relations between and/or among such data may be represented and stored in various ways known in the art, for example a relation in a relational database, a pointer, and/or a directed edge in a graph database. In one or more embodiments, the content delivery agent 210 receives the data in response to determination that the computing device 200 has entered an augment zone 102 and/or is within a certain geographical radius of an augment marker 300. For example, a mobile application on a smartphone may download data usable to detect instances of the augment marker 300 and present augment images 304 for the entire augment zone 102 of a public park as soon as the user 101 carrying the smartphone crosses a geofenced boundary into the public park.

The marker recognition system 212 comprises computer readable instructions that when executed on the processor 201 causes the processor 201 to detect an augment marker 300. In one or more embodiments, the marker recognition system 212 compares a capture image 205 of the augment marker 300 to one or more instances of the exemplar data 303, where each exemplar data 303 is associated with a marker ID 301, an augment ID 305, or even directly with the augment (e.g., the augment image 304). In the embedment of FIG. 2, the exemplar data 303A and the exemplar data 303B are shown, each associated with a marker ID 301A and a marker ID 301B, respectively. The marker ID 301A is associated with an augment image 304A (and possibly a display parameter data 517), which may or may not be stored on the computing device 200 before the augment request 104 is generated.

The comparison of the captured data usable to recognize the augment marker 300 (e.g., the capture image 205, data received from proximity to a beacon, an audible sound, a hypersonic sound, etc.) may occur through one or more comparison means known to those skilled in the art, which may include for example data filtering, refining, enhancing, abstraction, and/or matching.

In one or more embodiments, however, the capture image 205 (or other data usable to detect the augment marker 300) is transmitted over the network 100 to one or more of the servers of FIG. 1 to be recognized. Similarly, even where recognized on the computing device 200, the exemplar data 303 may only be associated with a marker ID 301 on the computing 200, and the marker ID 301 which may then be transmitted to one or more of the servers of FIG. 1 in the augment request 104 for redemption of the associated augment image 304.

Figure 6:
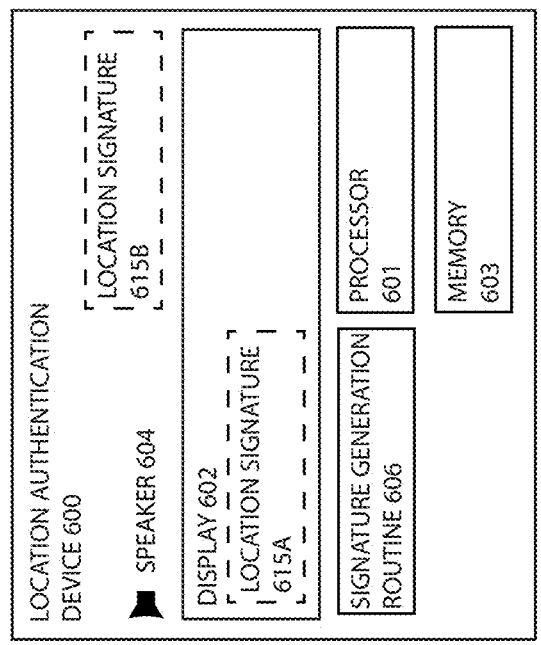
FIG. 6 illustrates a location authentication device including a speaker, a display of the location authentication device, and a signature generation routine to receive and/or generating a location signature to be displayed to the user at a physical location at which the augment marker is present, according to one or more embodiments.
Figure 13:
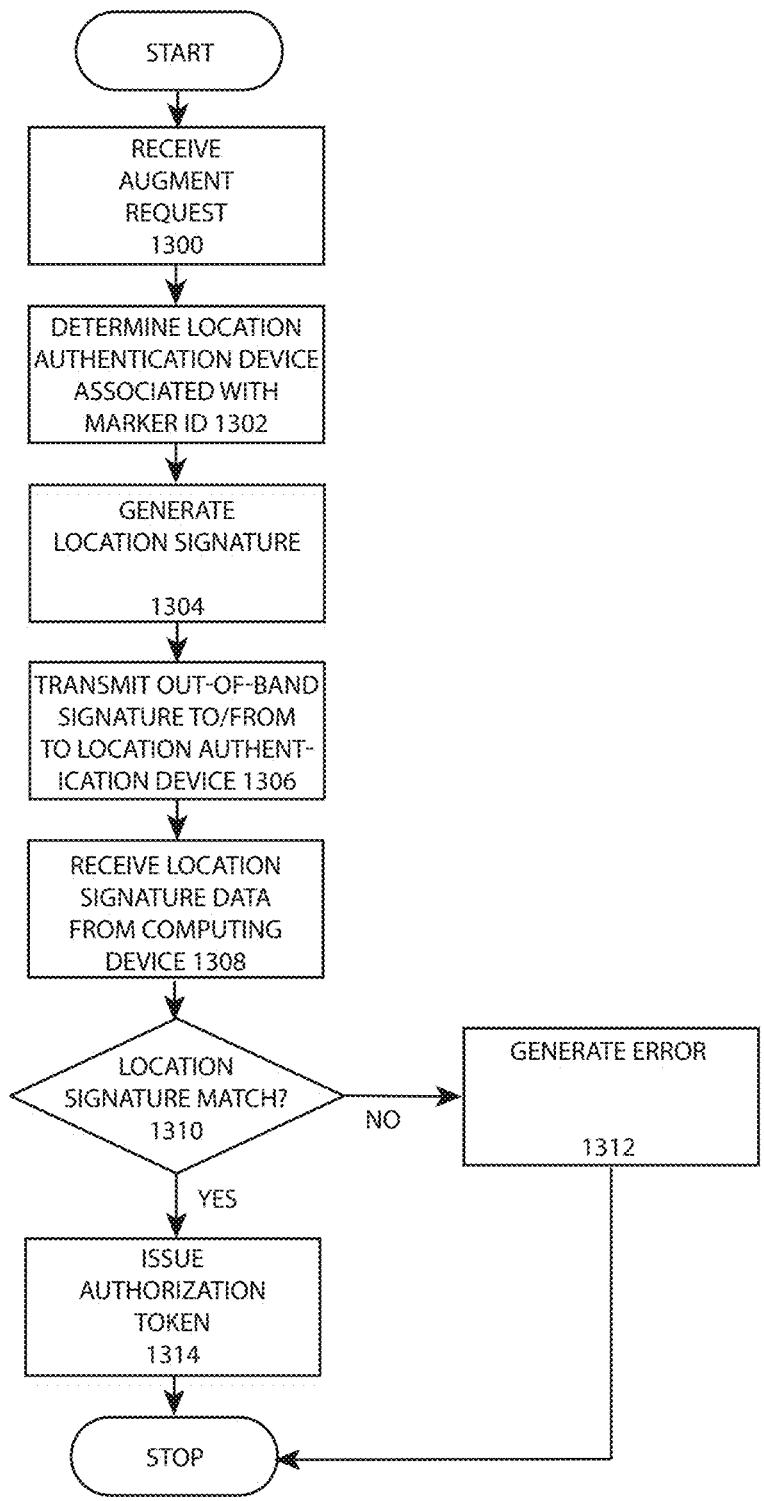
FIG. 13 is a process flow illustrating enhanced verification of the physical environment of the augment marker, including transmission of a location signature over the network an out-of-band to the location authentication device of FIG. 6, according to one or more embodiments.

The location verification module 214 comprises computer readable instructions that when executed on the processor 201 causes the processor 201 to either extract geospatial coordinate data 209 for inclusion in the augment request 104, and/or detect and receive a location signature data 215, and transmit the location signature data 215, to one or more of the servers of FIG. 1 for secure, increased certainty verification that the computing device 200 as shown and described in conjunction with FIG. 6 and FIG. 13.

The augment request module 216 formulates and transmits a request to initiate and/or present the augment to the user 101 (e.g., display the augment image 304 on the display 202 of the computing device 200). Depending on the configuration of the augment deployment network 120, the augment request 104 may comprise the marker ID 301 and/or the augment ID 305, and optionally a timestamp of the augment request 104, the geospatial coordinates data 209, the location signature data 215, and/or a user ID associated with at least one of the user 101 and the computing device 200 (the user ID not shown in the embodiment of FIG. 2).

The augment execution engine 218 comprises computer readable instructions that when executed on the processor 201 causes the processor 201 to initiates and presents the augment, including in response to receipt of an authorization token 511 generated by the control server 500 and/or receipt of the augment from the delivery server 400. In one or more embodiments the execution engine 218 first receives the augment (e.g., as a data file), receives the display parameter data 517, and/or receives the authorization token 511 for authorized presentation of the augment stored in the memory 203 of the computing device 200. The augment execution engine 218 then presents the augment, for example overlaying an augment image 304 on the display 202 while the physical environment 103 is visible on the display 202. The display parameter data 517 is a set of data specifying how the augment image should be presented, for example, for an augment image 304: what size it should be shown on the display 202 relative to the augment marker 300, what location or orientation it should be shown on the display 202 relative to the augment marker 300, it's overlay priority relative to other instances of the augment image 304, it's color or brightness, etc. The display parameter data 517 may also include certain conditions, for example certain parameters below a brightness of the physical environment 103 (e.g., nighttime settings). An example of the display parameter data 517 is shown and described in conjunction with the embodiment of FIG. 3. Upon successful presentation and/or display of the augment, the augment execution engine 218 may send an augment confirmation data 220 to one or more of the servers of FIG. 1.

FIG. 3 illustrates visual instances of the augment marker 300, the base image 302, the exemplar data 303, and the augment image 304, according to one or more embodiments. The exemplar data 303 comprises data usable to determine a match with captured data of an augment marker 300.

In general, in the present embodiments, the augment marker 300 is an object or signal that can be recognized to initiate the augment. In one or more embodiments, the augment marker 300 is a visual maker, for example an image, scene, or object that can be recognized through image recognition (e.g., via the marker recognition system 212 of FIG. 2). The image could be a graphic such as a poster. The image could be a person's face, whether in-person or a 3D reproduction. The image could also be an object that can be identified, including but not limited to through a machine learning algorithm, for example leaves of a plant. The image may be a mural. The scene may be an architectural work captured from a certain vantage point. The augment marker 300 can also be a signal communicated over a wireless communication protocol, for example near-field communication, detection of an RFID chip, or detection of a signal beacon. The augment marker 300 can also be a sound, for example an audible sound (e.g., a voice, a certain noise) or a hypersonic sound (e.g., which may be able to transmit information according to a soundwave communication protocol).

For a visual instance of the augment marker 300, the base image 302 is a larger image into which the augment marker 300 may be incorporated. For example, the base image 302 may be a music band poster, the augment marker 300 may be a distinct guitar held by one of the band members, and the unique marker 351 may be a set of light reflections and/or glistening graphics applied to the guitar. Verifying the unique marker 351 for each instance of the band poster may permit distinction between augment requests 104 generated by otherwise similar band posters, may create a way to tie the poster to particular geographic locations, and may be used as one way to verify geospatial coordinates are not spoofed. The unique marker zone 307 may be a designated location within and/or relative to the exemplar data 303 for recognition of the unique marker 351. For an audio instance of the augment marker 300, a first five seconds of a sound may be to recognize the augment marker 300, while a trailing two seconds may be used to recognize the unique marker 351, such that each deployed instances of the augment marker 300 is seven seconds.

The unique marker 351 is a unique aspect of an augment marker 300 that may otherwise be placed in several locations throughout the augmented reality deployment. For example, where the augment marker 300 is a band poster, sparkle graphics located in and around the guitar of a lead singer, arranged uniquely for each poster, may be utilized as the unique marker 351 of the augment marker 300.

As shown in the example of FIG. 3, the exemplar data 303 may be an image file to be matched against a filtered instance of the capture image 205. For example, the exemplar data 303 may be a black and white image, where a black/white filter may be applied to the capture image 205, with a predefined percentage of similarity determining a match. Other methods of recognition may use a Hidden Markov Model, or image machine learning processes such as TensorFlow by Google® and/or DeepFace by Facebook® (e.g., where an augment marker 300 may be a face of a person). In one or more embodiments, where the augment marker 300 is a set of data that may be transmitted visually (e.g., a QR code), through electromagnetic radiation (e.g., Bluetooth), or sound (e.g., audible sound protocols, hypersonic sound protocols), the exemplar data 303 may also be an alpha-numeric value to which the set of data is compared. For example, where the augment marker 300 is a QR code, the QR code may specify the marker ID 301 in alpha numeric characters, and in such case the exemplar data 303 may explicitly comprise the marker ID 301.

The augment may be an augment image 304, as may be supplemented by an augment audio 306 and/or an augment haptic 308 that augments the physical environment 103. The augment image 304 is displayed on a display 202 of the computing device 200, where through the display 202 is visible the physical environment 103 of the computing device 200. Alternatively, display 202 that is a transparency display may be used through which the physical environment 103 can be observed. The display image 304 is placed on the display in a display configuration 317 according to the display parameter data 517. The augment audio 306 could be used to reinforce the experience of the augment image 304. In the example of the band poster above, once a smartphone recognizes the guitar (e.g., the augment marker 300), the poster may "come to life" with an overlay image (e.g., the augment image 304) of the lead singer, and additionally the smartphone may start both playing music (e.g., the augment audio 306) and vibrating (e.g., the augment haptic 310). In another example, an augmented reality deployment implementing a treasure hunt for educational purposes in a historic district may use certain landmarks as augment markers 300 (e.g., a plaque). Upon recognition of the plaque, a historical scene may unfold on the display 202 (e.g., as the augment image 304) while a voiceover reads the content of the plaque (e.g., as the augment audio 306).

Figure 4:
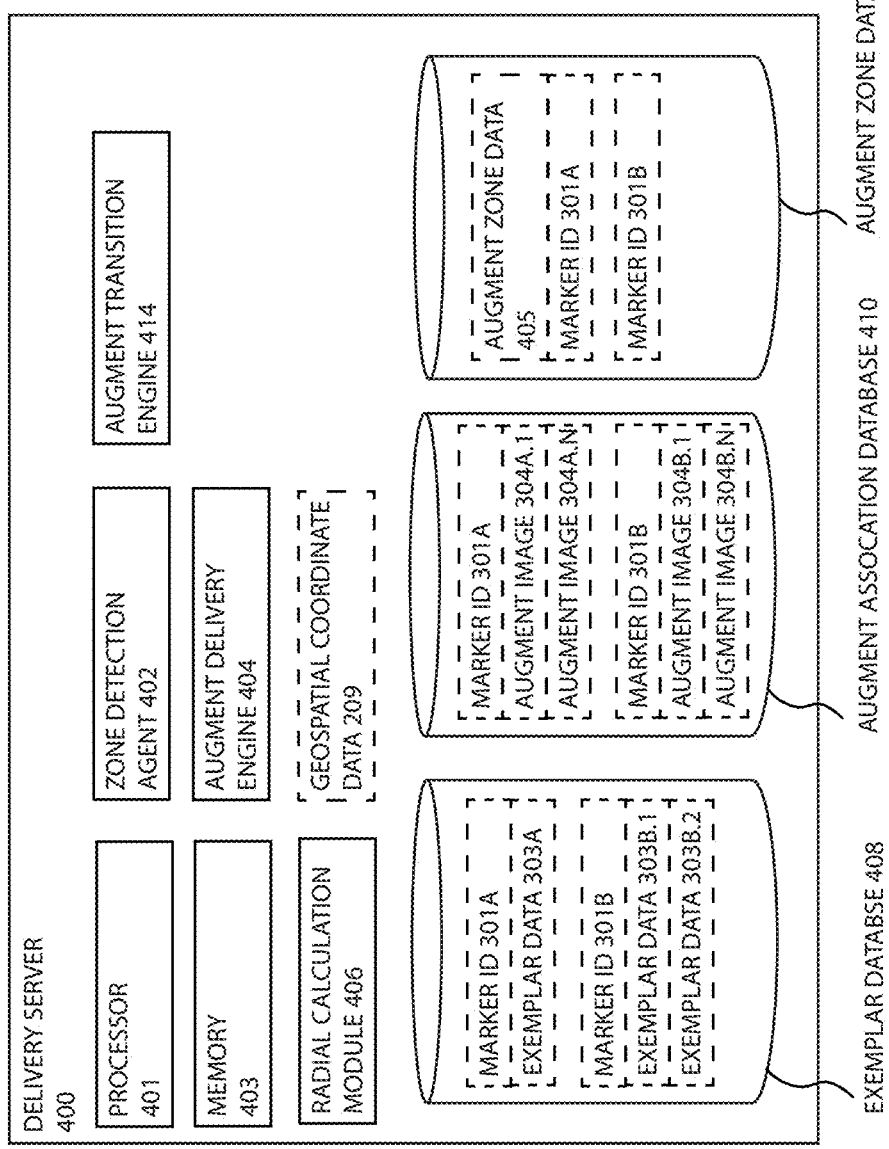
FIG. 4 illustrates the delivery server of FIG. 1, including a zone detection agent and radial calculation module that may be used for detection and advance preparation of augments the user may encounter, and an augment delivery engine to deliver one or more exemplar data and/or augments (e.g., instances of the augment image) in advance and/or upon request of the computing device of FIG. 2, according to one or more embodiments.

FIG. 4 illustrates the delivery server 400 that can be utilized to deliver instances of the exemplar data 303, the marker ID 301, the augment image 304, and other data, for example on demand, automatically upon the computing device 200 entering the augment zone 102, and/or automatically upon the computing device 200 moving within a certain distance of a geospatial coordinate associated with an augment marker 300. The delivery server 400 includes a processor 401 and a memory 403. The zone detection agent 402 comprises computer readable instructions that when executed on the processor 401 causes the processor 401 to, in response to receiving the geospatial coordinates 209, compare the geospatial coordinates 209 to geospatial coordinates of an augment zone data 405 to determine if the computing device 200 is within an augment zone 102 specified by the augment zone data 405. For example, the zone detection agent 402 may be periodically receiving geospatial coordinates from thousands of smartphones within a city with hundreds of augment zones 102 (e.g., an augment zone 102A, an augment zone 102B, etc.) each defined by an augment zone data 405 (e.g., an augment zone data 405A, and augment zone data 405B, etc.). Along these lines, the augment zone data 405 includes data specifying the augment zone 102, and is associated with one or more augment markers 300. In one or more embodiments and as shown in FIG. 4 the association is made through a database relation between the augment zone data 405 and one or more instances of the marker ID 301 (e.g., the marker ID 301A, the marker ID 301B, etc.) within an augment zone database 412.

Similarly, the radial calculation module 406 comprises computer readable instructions that when executed on the processor 401 causes the processor 401 to, in response to receiving the geospatial coordinate data 209, determine whether the computing device 200 is within a threshold distance of an augment marker 300 (e.g., 30 feet, 100 feet, 1 mile, 20 miles). The augment zone database 412 may include on or more instances of the marker ID 301 associated with a geospatial coordinate 409 of a physical location of an instance of the augment marker 300, along with additional data which may specify the threshold distance (not shown). The radial calculation module 404 calculates a distance between the geospatial coordinate 209 and the geospatial coordinate 409 and compare the calculated distance to the threshold distance to determine if the computing device 200 is within a radius of the augment marker 300. This may indicate the possibility that the user 101 may wish to initiate the augment associated with the augment marker 300.

The augment delivery engine 404 delivers data based on an on-demand request (e.g., the augment request 104), based on the computing device 200 entering the augment zone 102 and/or moving within the threshold distance of a geospatial coordinate 409 of an augment marker 300. In one or more embodiments, the augment delivery engine 404 may receive a marker ID 301 and in response deliver an augment (e.g., the augment image 304) to the computing device 200. In one or more embodiments, the augment delivery engine 404 may look up each of one or more instances of the marker ID 301 of the augment zone data 405 and deliver one or more instances of the exemplar data 303 (e.g., one instance of the exemplar data 303 for each instance of the marker ID 301).

In one or more embodiments, the augment marker 300 having a marker ID 301 may have two or more forms (e.g., may have a changing image) with two or more exemplar data 303 such that the marker recognition system 212 can detect the marker 300 in any of such forms. For example, an augment marker 300 may be a moving graphic with five frames, where each frame is represented by an exemplar data 303 (alternatively or in addition, a capture image 205 that is a video file could be matched against an exemplar data 303 that is a movie file and/or stored data sufficient to detect the augment marker 300 within the video file). As such, the marker ID 301 is shown associated with an exemplar data 303B.1 and an exemplar data 303B.2.

In one or more embodiments, a marker ID 301 may be associated with two or more augments as a set of augments (e.g., the marker ID 301A associated with augment image 304A.1 through the augment image 304A.n). In another example, although not shown in the embodiment of FIG. 4, a marker ID 301C may be associated with the augment image 304C and the augment audio 306. The set of augments may all be initiated and presented on the computing device 200, or only certain instances of the set of augments may be initiated and presented. For example, as described in detail below, the augment image 304A.1 may be presented for the first computing device 200 to detect the associated augment marker 300 (e.g., "you won!"), and a second augment image 304A.2 for any subsequent computing device 200 that detects the augment marker 300 (e.g., "sorry, prize already claimed").

Figure 5:
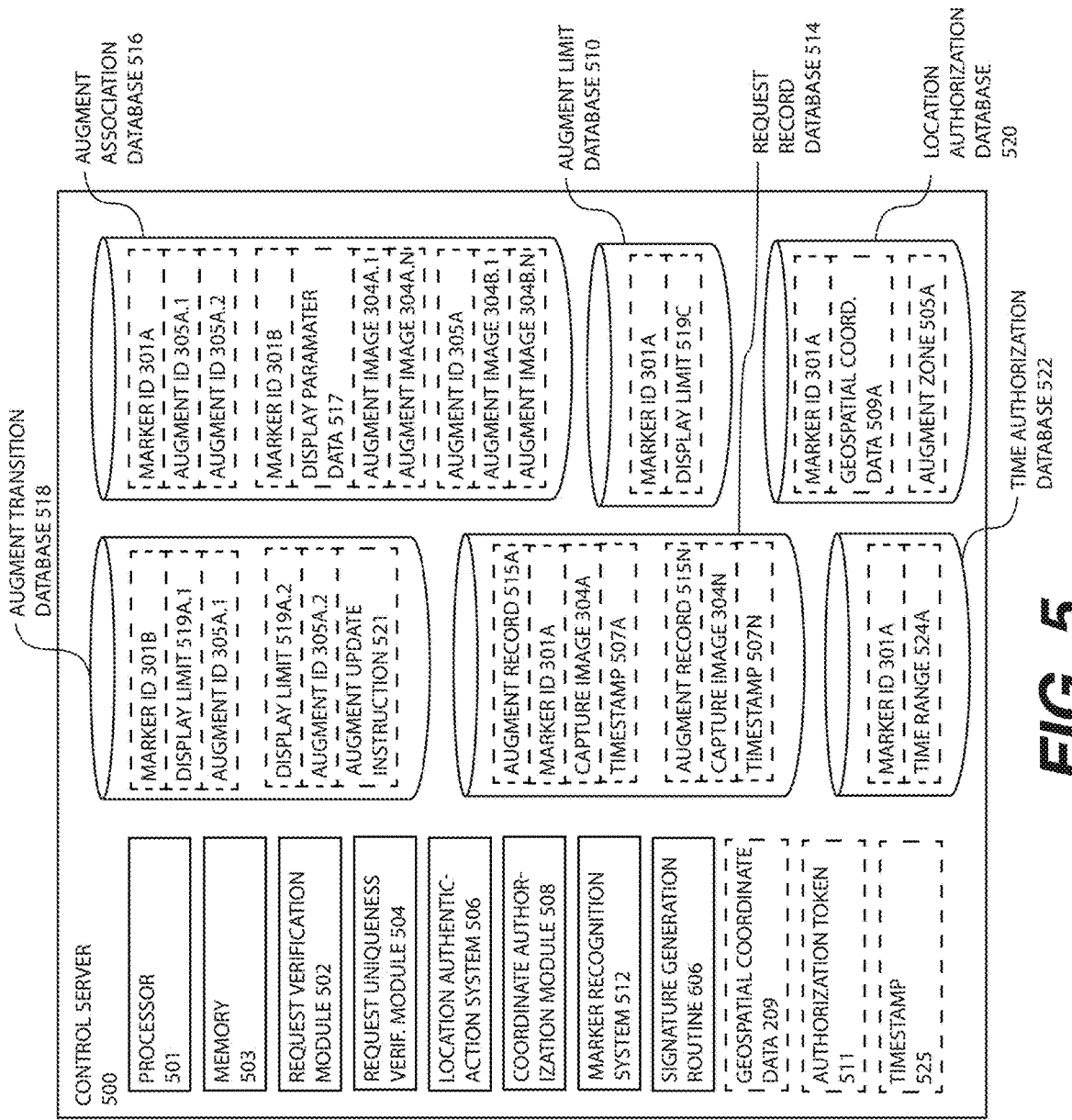
FIG. 5 illustrates the control server of FIG. 1 including a request verification module for verifying augment requests of the computing device of FIG. 2, a marker recognition system, an augment association database associating one or more marker IDs, Augments IDs, and augments, and other data a location authentication system usable in conjunction with a request record database for verifying authenticity of a an augment request and a location of a user, an augment transition database for defining automatic marker-augment associations upon predetermined conditions, and an augment limit database for defining a display limit of the augment, according to one or more embodiments.

FIG. 5 illustrates the control server 500, according to one or more embodiments. The control server 500 includes a processor 501 and a memory 503. The control server 500 may perform one or more control functions, including but not limited to: transitioning an augment and/or a display parameter data 517 associated with an augment marker 300 to another augment and/or another display parameter data 517; re-associating instances of the augment marker 300 with different or additional augments; controlling the augment based on determination of the geospatial coordinate data 209; verifying the authenticity of the augment request 104 and the associated capture data (e.g., the capture image 304); and/or validating a physical location of the computing device 200 tied to the augment marker 300 (e.g., utilizing location signature 615 of the location authentication device 600 of FIG. 6). In addition, the control server 500 may also be utilized to recognize markers utilizing a marker recognition system 512.

The request verification module 502 comprises computer readable instructions that when executed on the processor 501 causes the processor 501 to perform one or more verification processes of the control server 500 before issuing an authorization token 511 to initiate and present an augment already stored on the computing device 200 in response to an augment request 104 and/or transmitting an augment to be initiated and presented in response to an augment request 104 (e.g., which may occur in conjunction with the delivery server 400). The request verification module 502 may carry out verifications specified in a configuration file (not shown) associated with an instance of the marker ID 300.

The request verification module 502 may determine if a timestamp of the augment request 104 (e.g., the timestamp 507, which may be generated upon generation of the augment request 104 by the computing device 200 or on receipt of the augment request 104 by the control server 500) is within the time range 524 associated with the marker ID 301 in a time authorization database 522. The request verification module 502 may also determine if the augment marker 300 is within an augment limit (e.g., a display limit 519) for a total number of presentations of the augment for the augment marker 300. For example, where the first ten people to visit a location and experience an augment are to receive a prize, the augment limit may be set to a value of "10" such that the eleventh user 101 to generate an augment request 104 does not experience the augment and/or receives an error message.

In one or more embodiments, the request verification module 502 determines if a geospatial constraint has been placed on the augment marker 300. The request verification module 502 may then additionally call the coordinate authorization module 508. The coordinate authorization module 508 comprises computer readable instructions that when executed on the processor 501 causes the processor 501 to verify whether the augment is permitted to be initiated and presented at the location the computing device 200 that generated the augment request 104. For example, where the augment marker 300 may be located on, or be part of, a mobile object (e.g., an image on a t-shirt, a mural on the exterior of a bus), the request verification module 502 may verify that the location of the augment marker 300 is within an augment zone 102 (e.g., specified in augment zone data 505), and/or is within a distance of a geospatial coordinate 509. Such limitations may be advantageous when the augment and/or the augment marker 300 is intended to be used within an area of an event (e.g., a concert). The marker ID 301 in association with the geospatial coordinate data 509 and/or the augment zone data 505 may be stored in the location authorization database 520.

The request verification module 502 may also call for the request uniqueness validation routine 504. The request uniqueness validation routine 504 comprises computer readable instructions that when executed on the processor 501 compares the capture data (e.g., the capture image 205), and/or additional data that may be submitted with a current instance of the augment request 104, to data of previous instances of the augment request 104 each stored as an augment record 515. Where a match is determined, for example a capture image 205B from an augment request 104B submitted at a second time is determined to be substantially identical to a capture image 205A from an augment request 104A submitted at a first time, the augment request 104B may be rejected. This similarity may be above that expected to occur by capturing the same instance of the augment marker 300. For example, a substantial copying occur where multiple users 101 are generating augment data based on an a copy or representation of data obtained at the physical location intended to be associated with the augment marker 300 (e.g., a photo available online, a photo communicated from a smartphone in the presence of the physical environment to a smartphone at a remote location, etc.).

The request verification module 502 may also withhold the authorization token 511 and/or the augment until location is validated to a higher degree of certainty utilizing the location authentication system 506. The location authentication system 506 comprises computer readable instructions that when executed on the processor 501, either periodically, randomly, and/or in response to receipt of the authorization request 104, issues a location signature (e.g., the location signature 615) to the location authentication device 600. The location authentication system 506 may then await receipt of the location signature 615 from the computing device 200, as shown and described in conjunction with FIG. 13. Upon completing all desirable and/or specified verifications, the request verification module 502 may issue the authorization token 511 and/or transmit the augment (e.g., the augment image 104) to the computing device 200. Upon verification of the augment request 104, the request verification module may issue the authorization toke 511 and/or transmit the augment (e.g., the augment image 304) to the computing device 200.

The control server 500 may also perform the function of recognition of the augment marker 300 via the marker recognition system 512, which may execute with similar means to the marker recognition system 212 as shown and described in FIG. 2.

As shown and described in FIG. 3, and throughout the present embodiments, an augment marker 300 and one or more augments may be associated in a database in several ways. An augment marker 300 may have an associated marker ID 301, and an augment may have an associated augment ID 305. The marker ID 301 may be associated in a database with one or more instances of the augment ID 305 and/or directly with one or more instances of the augment. The display parameter data 517 may be associated with the marker ID 301 and/or the augment ID 305 in a database. The marker ID 301 may be associated with one or more control parameters (e.g., the display limit 519) in a database. Several such possible arrangements are demonstrated in the augment association database 516.

In one or more embodiments, the augment that may be initiated and presented may depend on one or more instances of the display limit 519. As shown and described in the augment transition database 518, prior to a display limit 519A.1 (e.g., the first 50 augment requests) the augment associated with the augment ID 305A.1 may be presented. After the display limit 519A.1 but prior to the display limit 519A.2 (e.g., the next 1000 augment requests) the augment associated with the augment ID 305A.2 may be presented, etc. As shown and described in conjunction with FIG. 12, any updates to the augment may be continually provided to the computing device 200 to supplement the augments pre-loaded for anticipation of marker recognition and/or to transmit new augment such that a user 101 experiencing a first augment has the first augment replaced by the new augment, which may occur live and/or in real time.

FIG. 6 illustrates the location authentication device 600, according to one or more embodiments. The location authentication device 600 is a computing device that can communicate a location signature 615 to the user 101 and/or the computing device 200. The location authentication device 600 includes a processor 601 and a memory 603. The signature generation routine 606 comprises computer readable instructions that when executed on the processor 601 receives the location signature 615 (e.g., from the control server 500) and/or generates a location signature 615 and communicates it to the control server 500. The location signature 615 is a value such as a code (e.g., alpha numeric value), unique identifier, a globally unique identifier (GUID), and/or or random number. The user 101 enters the location signature 615 on the computing device 200 and/or the location signature 615 is automatically transferred to the computing device 200, e.g., through a Bluetooth protocol, a light-based protocol, a sound-based protocol (including a hypersonic sound), and/or through a near-field protocol. For example, the user 101 may see the augment marker 300, detect the augment marker 300 using a smartphone (e.g., the computing device 200) to generate the augment request 104, may be presented with the location signature 615 on the display 602 of the location authentication device 600 that may be positioned within the physical environment 103 of the augment marker 300, and may be prompted to enter the code on the smartphone. Upon entering the code, the user 101's location may have been validated to a higher degree of certainty. A process flow illustrating one or more processes of FIG. 6 is shown and described in conjunction with FIG. 13. In one or more embodiments, the augment marker 300 may be presented on a screen, for example a monitor. In such case, the screen may act as the location authentication device 600, e.g., to display the location signature 615 as shown and described in conjunction with FIG. 13.

Figure 7:
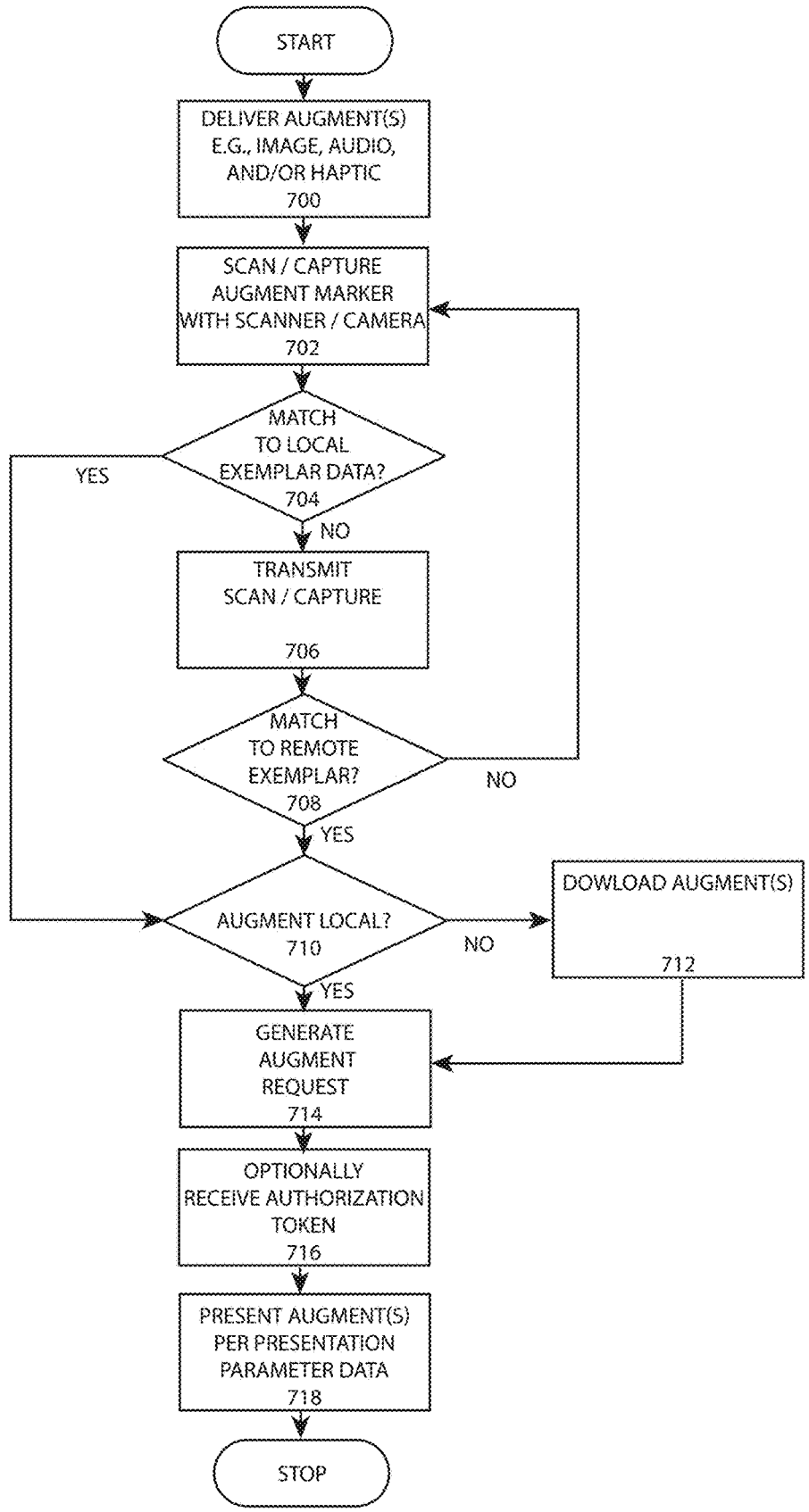
FIG. 7 is a process flow illustrating delivery of the augment, recognition of the augment marker against the exemplar data, generation of the augment request, and authorization and display of the augment stored on the computing device and received from the content server of FIG. 4 on demand over the network, according to one or more embodiments.

FIG. 7 is a process flow illustrating delivery of the augment (e.g., the augment image 304, the augment audio 306, and/or the augment haptic 308), recognition of the augment marker 300 against the exemplar data 303, generation of the augment request 104, and authorization and display of the augment, according to one or more embodiments. Operation 700 delivers the augment (e.g., the augment image 304, the augment audio 306, and/or the augment haptic 308) to the computing device 200. The augment may be transmitted on demand, e.g., upon receiving the augment request 104, or before generation of the augment request 104, such as upon the computing device 200 entering the augment zone 102 and/or if a user 101 manually selects one or more augments, augment markers 300, and/or augment packages (e.g., a specific event the user 101 will be attending), for example though a smartphone app or as downloaded through a website interface. In one or more embodiments, the augment may be streamed (e.g., from the content server 400 to the computing device 200). Operation 702 scans and/or captures the augment marker 300 with a scanner (e.g., the scanner 206) and/or a camera (e.g., the camera 204). For example, a smartphone camera may be used to take a photo and/or a video (e.g., the capture image 205) of the augment marker 300, and/or a laser scanner may be used to scan a barcode. Alternative means can also be utilized to capture non-visual instances of the augment marker 300, such as a wireless communication interface 222 to receive a Bluetooth signal and/or a beacon signal.

Operation 704 determines if the capture data and/or the scan data matches the exemplar data 303 located on the device 200. Operation 704 may utilize one or more of several methods known in the art to identify the augment marker 300 and compare the augment marker 300 to the exemplar data 303. Operation 704 may crop or reduce an area of the capture data or scan data to create a reduced dataset for the comparison (e.g., identify a face of a person or the outline of a building), filter the capture data or scan data (e.g., apply a noise filter, a sharpen mask), and/or additional post-capture and/or post-scan processes to improve the likelihood of the comparison determination. A machine learning process may also be employed whereby previous captures and/or scans (including but not limited to those with verification through the request verification module 502) are used to improve comparisons of future captures and/or scans. Operation 704 may be effected, for example, by the marker recognition system 212. Where operation 704 determines a match, operation 704 extracts an associated marker ID 301 and/or augment ID 305 and proceeds to operation 710. Where operation 704 does not determine a match locally to the computing device 200 and/or the computing device is not storing a copy of the exemplar data 303, operation 704 proceeds to operation 706.

Operation 706 transmits the capture data (e.g., the capture image 205) and/or the scan data (e.g., the scan data 207) to one or more servers of the augment deployment network 120, for example the delivery server 400 and/or the control server 500. The capture data may be included in the augment request 104, and/or may be a discrete communication and/or request for recognition of the augment marker 300.

Operation 708 determines a match between the capture data and/or the scan data and the exemplar data 303 on a server of the augment deployment network 120, for example the delivery server 400 and/or the control server 500. Operation 708 may utilize similar processes and/or methods to operation 704. Operation 708 may be effected, for example, by the marker recognition system 512. In one or more embodiments marker recognition may occur remotely from the computing device 200, and in such case operation 702 may proceeds directly to operation 708. Where no match is determined, operation 708 returns to operation 702 to re-initiate a capture and/or a scan. Where a match is determined, operation 708 delivers a marker ID 301 and/or augment ID 305 associated with the exemplar data 303 and proceeds to operation 710.

Operation 710 determines whether the augment associated with the augment marker 300 (e.g., the augment image 205) is stored locally on the computing device 200. If not, operation 710 proceeds to operation 712 which may be request download one or more augments, either through submission of the marker ID 301 and/or the augment ID 305. Operation 710 may also proceed as part of formulation of the augment request in operation 714 or may occur after submission of the augment request 714. The augment data may be returned with the augment parameter data (e.g., the augment display data 517).

Operation 714 generates an augment request 104, which may be either an internal call within the computing device 200 for initiation and presentation of the augment, and/or is a submitted augment request 104 submitted, for example, to the control server 500. The augment request 104 may include but is not limited to the capture data (e.g., the capture image 205) and/or the scan data (e.g., the scan data 207), the marker ID 301, the augment ID 305, the geospatial coordinate data 209, a user ID of the user 101 associated with the computing device 200, a device ID of the computing device 200, the location signature data 215 (as shown and described in FIG. 13) and/or additional data. Operation 716 optionally receives an authorization token 511 for authorization for the computing device 200 to initiate and present the augment (e.g., the augment image 304 to be displayed on the display 202). In one or more embodiments, the authorization token 511 is a set of data authorizing initiation and presentation of the augment on the computing device 200 and/or another computing device. For example, the authorization token 511 may be a code, hash, GUID, or other data required for a smartphone application (e.g., on the computing device 200) to read a data file of the augment from memory (e.g., the memory 403) for presentation and/or redeem with another server (e.g., the content server 400) to receive the data file of the augment. The authorization token 511 may be checked internally for consistency and validity (e.g., by an application of a smartphone), or may be transmitted and verified by the content deliver server 400 before transmitting the augment data (e.g., the augment image 304) to the computing device 200. In one or more embodiments, the authorization token 511 may be returned simultaneously with the augment data in response to the augment request 104.

Operation 718 initiates and presents the augment in accordance to the augment parameter data. For example, the augment image 304 may be placed directly centered over the augment marker 300 or a defined distance in one direction or the other on the screen and/or in 3D space within the physical environment 103. In a specific example, an augment marker 300 such as an identified human face may have displayed above it, as an instance of the augment image 304, a comic thought bubble with an an emoji appearing in the through bubble based on a detected facial expression, and an instance of the augment audio 306 creating an associated sound effect such as, for a puzzled emoji expression, "hmmm." The augment audio 306 may be initiated, in accordance with the augment parameter data, 1.5 seconds after the augment image 304 is presented on the display 202.

Figure 8:
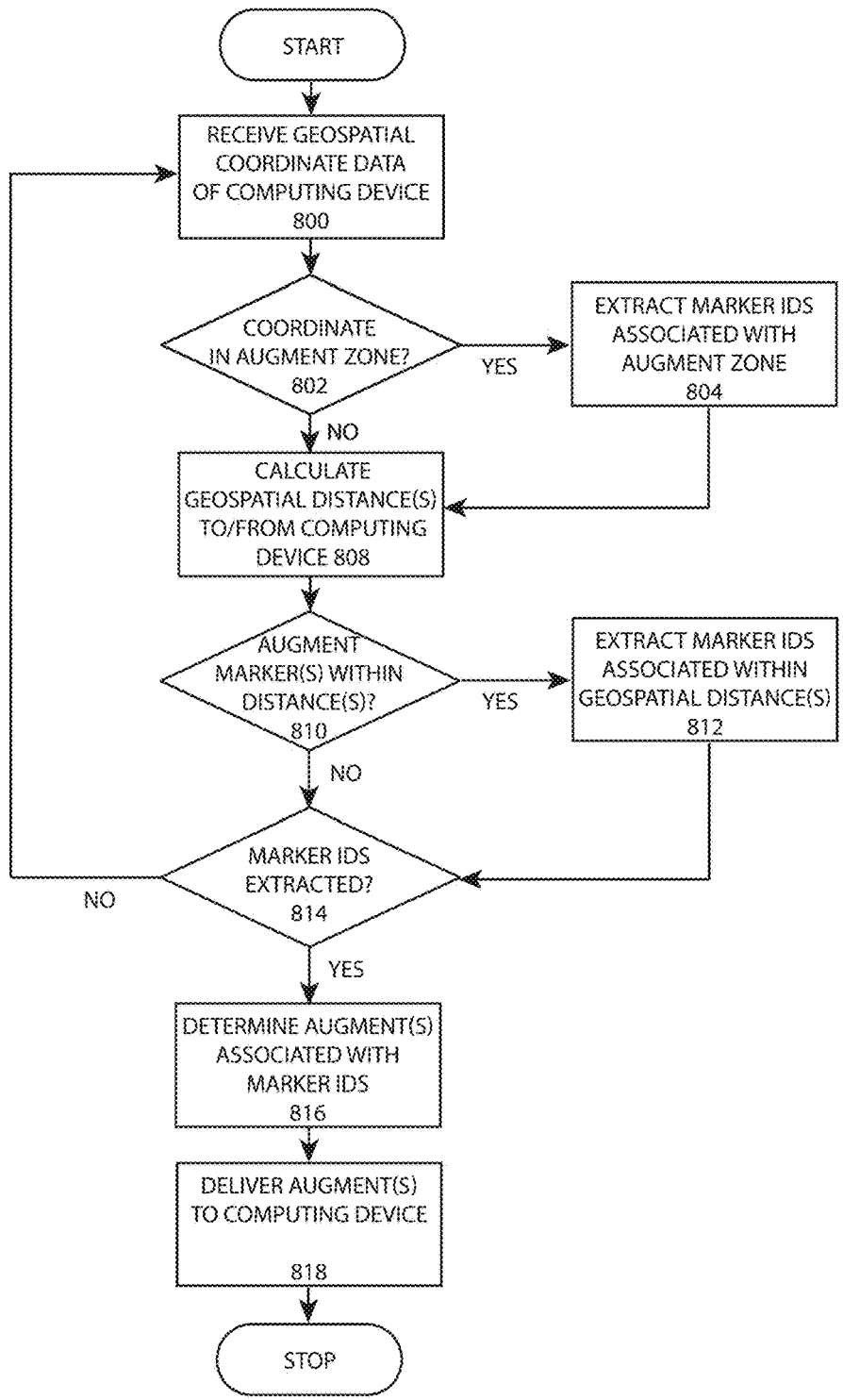
FIG. 8 is a process flow illustrating delivery of exemplar data and/or augments based on presence of the computing device of FIG. 2 within an augment zone and/or presence of one or more augment markers within a geospatial radius, according to one or more embodiments.

FIG. 8 is a process flow illustrating delivery of the exemplar data 303 and/or augments (e.g., the augment image 304, the augment audio 306, and/or the augment haptic 308) based on presence of the computing device 200 of FIG. 2 within an augment zone 102 and/or presence of one or more augment markers within a geospatial distance (e.g., of an augment marker 300), according to one or more embodiments. Operation 800 receives a geospatial coordinate data 209 from the computing device 200. Also, the geospatial coordinate data 209 may be received in conjunction with an instance of the augment request 104 such that the augment request 104 for on instance of an augment marker 300 may initiate download of augment data of an augment zone 102.

Operation 802 determines if a geospatial coordinate (e.g., determined from the geospatial coordinate data 209) is within an augment zone 102 (e.g., as defined by the augment zone data 405). Where the geospatial coordinate is within the augment zone 102, operation 802 proceeds to operation 804. Operation 804 extracts one or more instances of the marker ID 301 for each instance of the augment marker 300 associated with the augment zone 102 (e.g., each instance of the marker ID 301 associated with the instance of the augment zone data 405 in the augment zone database 412 of FIG. 4) and stores the one or more instances of the marker ID 301 in memory (e.g., the memory 403). Operation 804 then may proceed to operation 808. Where the geospatial coordinate is not determined to be within the augment zone 102, operation 802 also may proceed to operation 808.

Operation 808 calculates geospatial distance(s) from the computing device 200 (e.g., based on the geospatial coordinate data 209) to, and/or to the computing device 200 from, one or more instances of the augment marker 300 with a known location (e.g., using the geospatial coordinate data 409). The geospatial distance(s) may be a radius (or other shape) centered on the computing device 200 and/or the augment marker 300 with the known location. Additional shapes may be a square, three dimensional objects like a sphere, or shapes based on likely trajectories (e.g., a cone whereby the tip of the cone is a current location and extending outward toward a current movement vector). Operation 810 determines whether one or more augment markers 300 (e.g., by reference to the geospatial coordinate 409 of the augment marker 300 in the augment zone database 412) are within a threshold distance. In one or more embodiments, each augment marker 300 may have a different threshold distance. For example, an augment marker 300A may be relevant within 1 mile, whereas an augment marker 300B may be relevant within 100 feet, e.g., because the augment marker 300A is associated with an augment data that is large (e.g., 100 Mb) and substantial time may be required to download the augment before generation of the augment request 104.

Operation 812 extracts one or more instances of the marker ID 301 within one or more threshold distance(s). For example, operation 812 may extract all instance of the augment marker 300 (e.g., all within 200 meters), and/or others based on distance from the augment marker 300 to the computing device 200 (e.g., extracting an augment ID 305C for an augment marker 300C that is triggered to be extracted when the computing device 200 is within 0.45 kilometers). Operation 812 then proceeds to operation 814. Similarly, if no augment markers are within the distance and/or radius, operation 810 proceeds to operation 814.

Operation 814 determines if any extracted instances of the marker ID 301 are stored in memory (e.g., the memory 403). If no instances of the marker ID 301 have been extracted, operation 814 returns to operation 800. Where instances of the marker ID 301 have been extracted, operation 814 proceeds to operation 816. Operation 816 determine one or more instances of the augment associated with the one or more instances the marker ID 301 extracted from operation 804 and/or operation 812. Reference may be made to one of any type of data stored in association with the marker ID 301, for example the augment data (e.g., the augment image 304), the augment ID 305, and/or the exemplar data 303. Operation 818 then delivers the type of data to the computing device 200 through the network 100.

Figure 9:
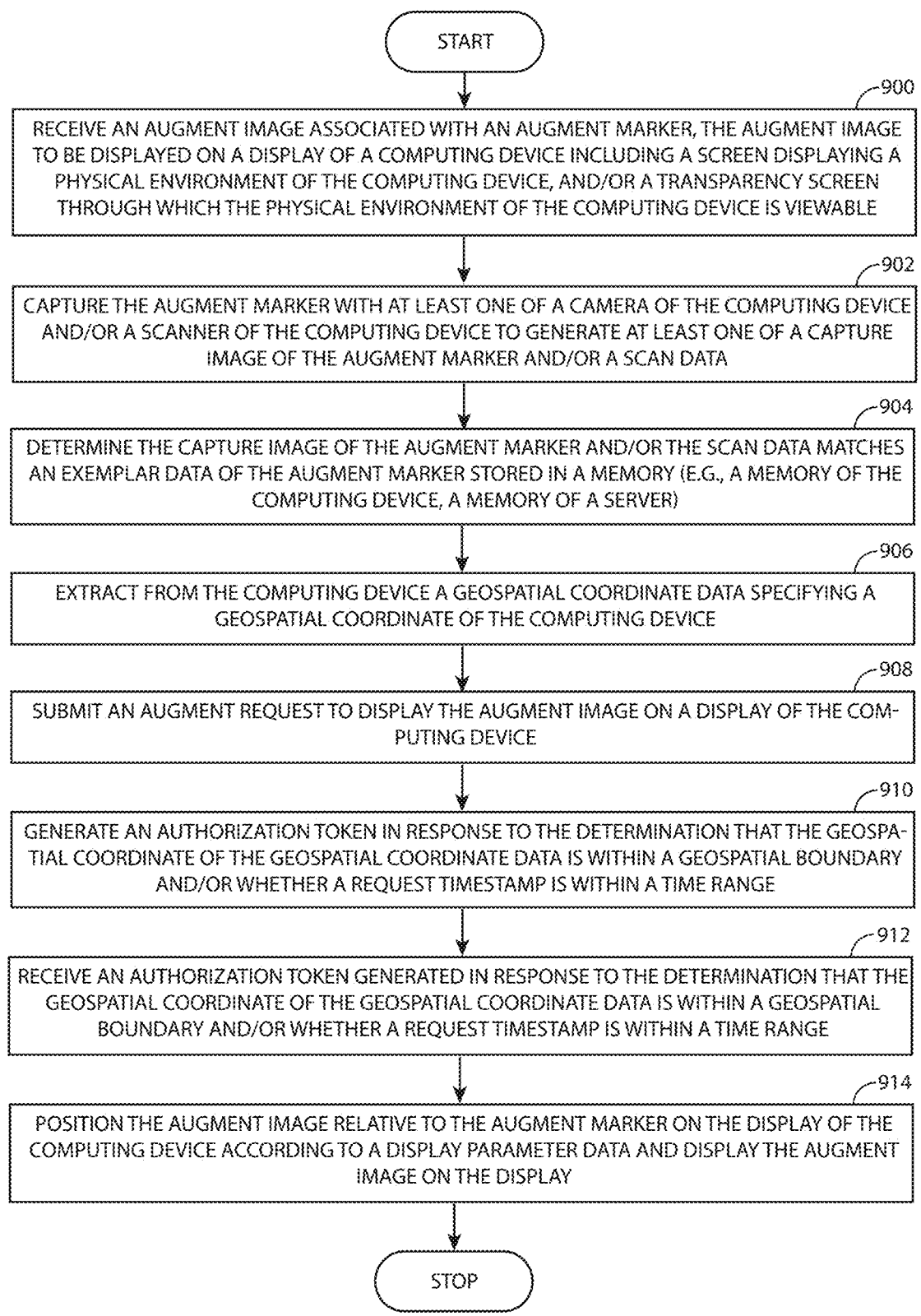
FIG. 9 is a process flow illustrating an authorization of presentation of the augment based on a geospatial coordinate of a physical environment of the augment marker, according to one or more embodiments.

FIG. 9 is a process flow illustrating an augment authorization based on a geospatial coordinate of a physical environment 103 of the computing device 200, according to one or more embodiments, and specifically a visual instance of the augment marker 300 as augmented by an augment image 304. Operation 900 receives an augment image 205 associated with an augment marker 300, the augment image 205 to be displayed on a display 202 (e.g., a screen) of a computing device 200 (e.g., a smartphone) including a screen displaying a physical environment 103 of the computing device 200, and/or a transparency screen (e.g., of a set of transparent augmented reality glasses) through which the physical environment 103 of the computing device 200 is viewable. The augment image 205 may be received in conjunction with and/or in response to generation of the augment request 104 described below. Operation 902 captures the augment marker 300 with at least one of a camera 204 of the computing device 200 and/or a scanner 206 of the computing device 200 to generate at least one of a capture image 205 of the augment marker 300 and/or a scan data 207 of the augment marker 300.

Operation 904 determines the capture image 205 of the augment marker 300 and/or the scan data 207 matches an exemplar data 303 of the augment marker 300 stored in a memory (e.g., the memory 203, the memory 303, the memory 403, the memory 503). Operation 906 extracts from the computing device 200 a geospatial coordinate data 209 specifying a geospatial coordinate of the computing device 200. Operation 908 submits an augment request 104 to display the augment image 204 on a display 202 of the computing device 200. Operation 910 generate an authorization token 511 in response to the determination that the geospatial coordinate of the geospatial coordinate data is within a geospatial boundary and/or whether a request timestamp is within a time range 524. The time range 524 is data specifying the time range in which the augment event is authorized, for example combinations of times, dates, days of the week, or any other temporal specification that can be calculated including a time limit to respond to an augment event.

Operation 912 receive an authorization token 511 generated in response to the determination that the geospatial coordinate of the geospatial coordinate data 209 is within a geospatial boundary and/or whether the request timestamp is within a time range 524. The authorization token 511 may be accompanied with the augment image 304, or may be transmitted discretely. Operation 914 positions the augment image 304 relative to the augment marker 300 (e.g., a visual augment marker) on the display 202 of the computing device 200 according to a display parameter data 517 and displays the augment image 304 on the display 202. The display parameter data 517 may specify a size, an orientation, or additional display rules for the augment image 304 based on a relative size, an orientation, or additional display characteristics of the augment marker 300 as shown and described in conjunction with FIG. 3.

Figure 10:
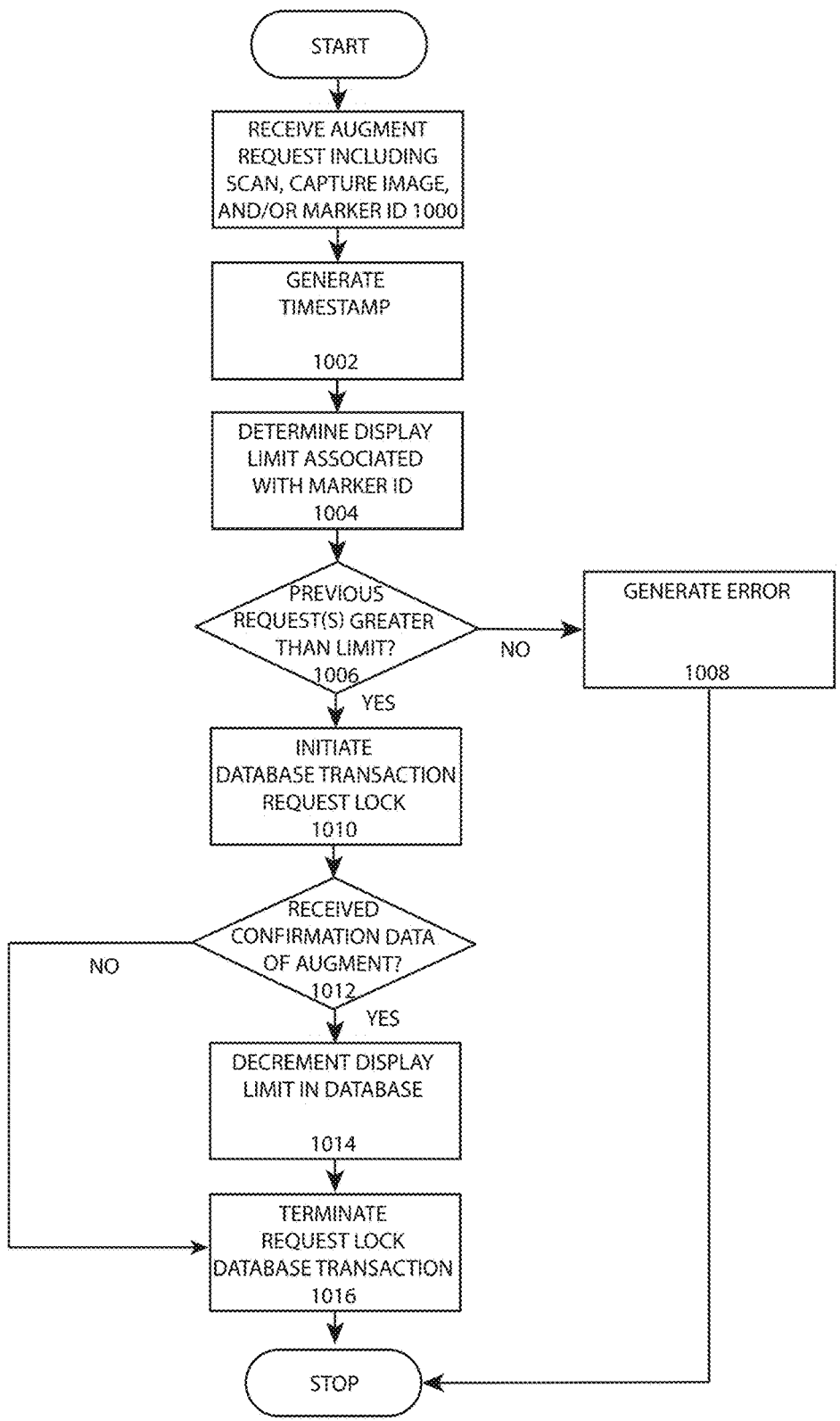
FIG. 10 is a process flow illustrating control over an augment presentation limit (e.g., an augment display limit), including initiating a database transaction request lock upon receiving an augment request and decrementing a display limit upon receipt of a confirmation data that the user experienced the augment, according to one or more embodiments.

FIG. 10 is a process flow illustrating control over augment display limits, including initiating a database transaction request lock upon receiving an augment request 104 and decrementing a display limit 519 upon receipt of a confirmation data 220 that the user 101 experienced the augment (e.g., that the computing device 200 displayed the augment in accordance with the augment parameter data (e.g., the display parameter data 517)), according to one or more embodiments. Operation 1000 receives an augment request 104 including a scan data 207, a capture image 205, and/or a marker ID 301. In one or more embodiments, operation 1000 may receive an augment ID 305. Operation 1002 generates a timestamp of the augment request 104. The timestamp may be generated by the computing device 200 and/or by the control server 500 (e.g., the timestamp 225, the timestamp 525). Operation 1004 determines a display limit 519 associated with the marker ID 301 (e.g., the marker ID 301 that is transmitted with the augment request 104, or determined from analysis of the scan data 207, the capture image 205, and/or the augment ID 305). For example, the display limit may be looked up in the augment limit database 510 of FIG. 5.

Operation 1006 determines whether a current value of a current number of augment requests previously submitted is greater than the augment limit (e.g., the display limit 519 for the augment image 304). Where a number of previous augment requests 104 and/or augment requests 104 for which an augment confirmation data 220 was received is greater than the display limit 519, operation 1006 proceeds to operation 1008 which generates an error. The error of operation 1008 may be presented to the user 101 on the computing device 200 as a message ("Sorry, this location is now exhausted."). Otherwise, operation 1006 proceeds to operation 1010.

Operation 1010 initiates a database transaction request lock such that a pending instance of the augment request 104 reserves a position in the display limit 519, e.g., such that if the display limit 519 is ten, and the a current instance of the augment request 104 is the tenth instance of the augment request 104, an eleventh instance of the augment request 104 will generate the error of operation 1008 even before the tenth instance of the augment request 104 is fully resolved. Operation 1012 determines whether an augment confirmation data 220 has been received (e.g., as may be generated by the computing device 200 upon complete presentation of the augment such as the augment image 304). The augment confirmation data 220, for example, may be generated when it is detected that the user 101 participated in the entire augment experience (e.g., did not turn off the screen), an augment image 104 displayed correctly (e.g., the augment marker 300 remained within view such that the augment image 104 could be displayed at all times in conformity with the display parameter data 517), etc. Where no augment confirmation data 220 is received and/or is not received within a set time, operation 1012 proceeds to operation 1016. Otherwise, operation 1012 proceeds to operation 1014. Operation 1014 logs the successful and/or complete augment of the computing device 200, for example by decrementing the augment limit (e.g., the display limit 519) and/or adding to a number of tracked instances of the augment request 104. Operation 1016 then terminates the request lock on the database transaction.

Figure 11:
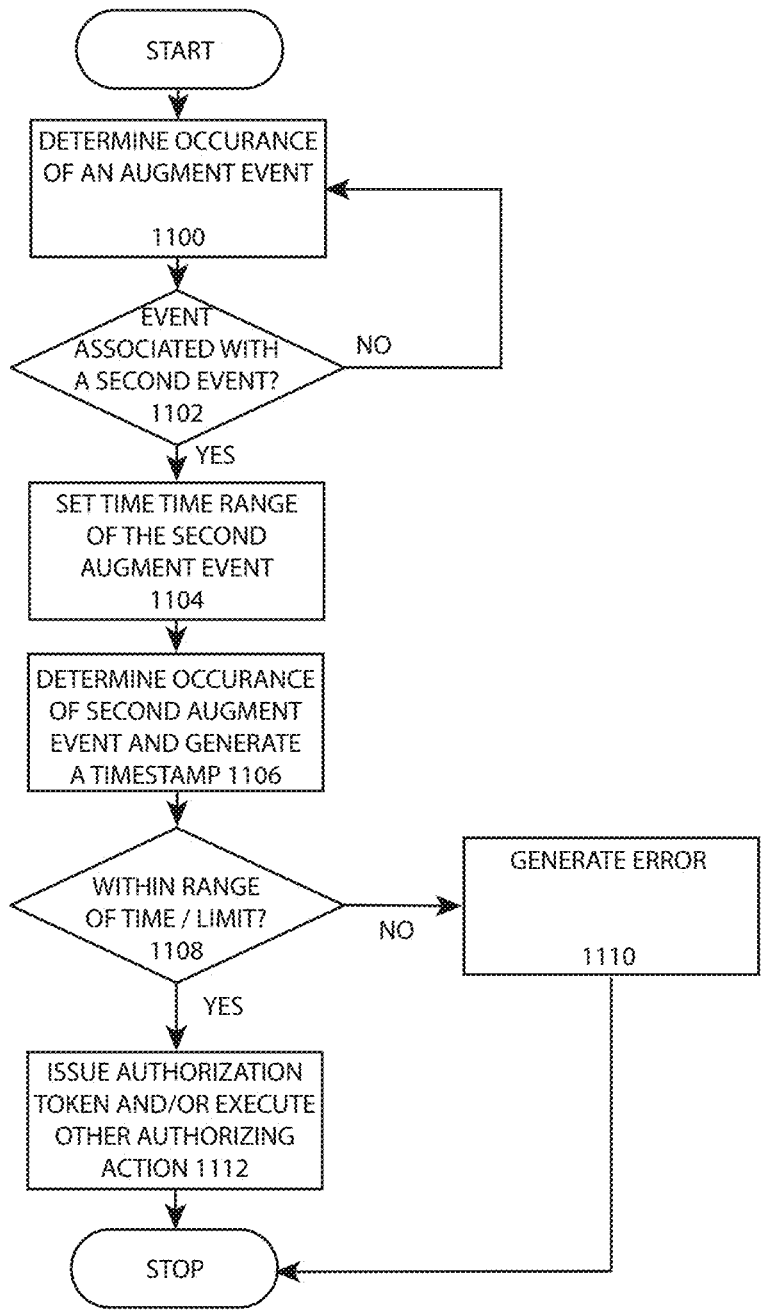
FIG. 11 is a process flow illustrating upon determination of a first augment event initiating a time range for a second augment event to control issuance of an authorization token for the second augment event, according to one or more embodiments.

FIG. 11 is a process flow illustrating upon determination of a first augment event initiating a time range 524 for a second augment event to control issuance of an authorization of the second augment event, according to one or more embodiments. Operation 1100 determines an augment event has occurred. The determination may be made, for example, by the control server 500. The augment event may be any one of the following: (i) reading, and/or detecting an augment marker 300 (e.g., by the computing device 200), (ii) generating an augment request 104, (iii) initiating and/or presenting an augment (e.g., the augment image 304, the augment audio 306, and/or the augment haptic 308), and/or (iv) the computing device 200 entering an augment zone 102 and/or moving within a distance of an instance of the augment marker 300.

Operation 1102 determines if a marker ID 301 and/or an augment ID 305 is associated with the augment event. If not, operation 1102 returns to operation 1100 for detection of a next augment event. If a marker ID 301 and/or an augment ID 305 is associated with the augment event, operation 1102 proceeds to operation 1104. Operation 1104 sets a time range 524 of a second augment event. The second augment event, for example, may be initiating a second instance of the time range 524 associated with at least one of a second instance of the marker ID 301 and/or a second instance of the augment ID 305. Operation 1106 determines occurrence of the second augment event and generates a timestamp of the second augment event. Operation 1106 may occur immediately or a period of time after operation 1104 (e.g., a second, an hour, a month, a year). Operation 1108 determines if the timestamp of the second augment event is within the time range 524, and if not proceeds to operation 1110 which generates an error. However, where operation 1108 determines that the second augment event is within the time range 524, operation 1110 proceeds to operation 1112 which issues an authorization token 511 to initiate and/or present an augment, and/or carries out other authorization actions associated with the sent augment event such as permitting the user to receive downloads associated with an instance of the augment zone 102.

In a specific example, operation 1100 may determine a first augment event when the user 101 (in possession of the computing device 200) enters the augment zone 102 (e.g., as defined and determined by the augment zone data 405). Operation 1102 may determine that the augment event of entering the augment zone 102 is associated with five instances of the marker ID 301 which may be identifiers of five augment markers 300 within the augment zone 102. Operation 1104 may then set a time range 524, which may or may not be limited to the user 101 or may be extended to all instances of the user 101 of the augmented reality deployment. As a result, entering the augment zone 102 may set a time limit on experiencing the five instances of the augment associated with each of the five instances of the augment marker 300. Similarly, the first augment event may be entering a first augment zone 102A, and the second augment event may be entering a second augment zone 102B, such that augment activity (e.g., detecting instances of the augment marker 300) within the augment zone 102B depends on having entered within a countdown timer (e.g., an instance of the time range 524) initiated when entering the augment zone 102A. This may be desirable for example in games and promotions where a time constraint adds to the user experience and/or helps to keep users 101 moving throughout the locations of the augment reality deployment.

Figure 12:
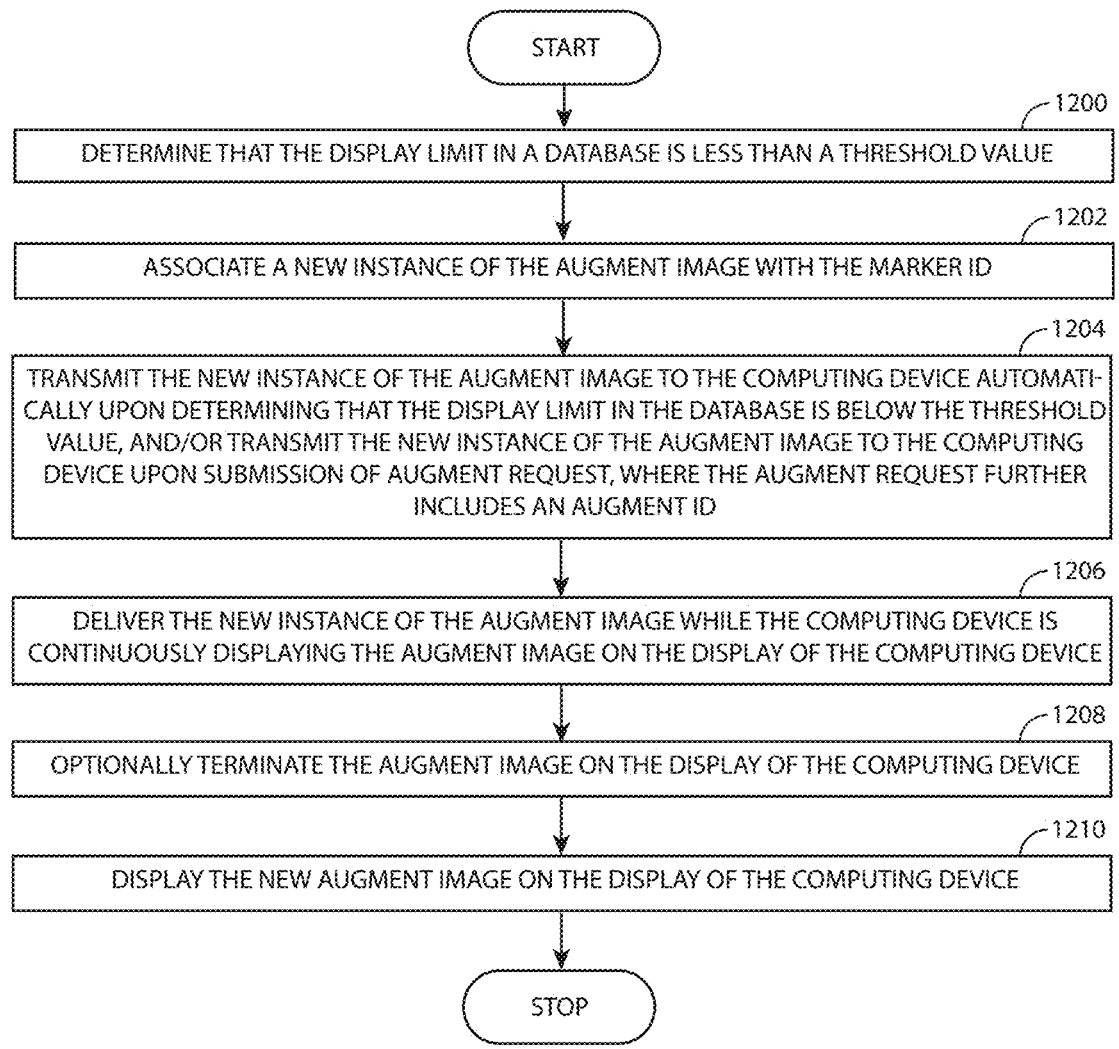
FIG. 12 is a process flow illustrating a transition from a first augment to a second augment, including during continuous presentation and/or display of the first augment on the computing device of FIG. 2, according to one or more embodiments.

FIG. 12 is a process flow illustrating a transition from a first augment to a second augment, including during continuous presentation and/or display of the first augment on the computing device of FIG. 2, according to one or more embodiments. Operation 1200 determines that the display limit 519 in a database (e.g., the augment transition database 518) is less than a threshold value. The threshold value may be determined on a per-user and/or per-device basis, or may be shared among a group or all of the instances of the user 100 and instances of the computing device 200 within the augmented reality deployment. Operation 1200 associates a new instance of the augment image 304 with the marker ID 301 (which may include utilizing the augment ID 305 to form such association in a database). Operation 1204 transmits the new instance of the augment image 304 to the computing device 200 automatically upon determining that the display limit 519 in the database is below the threshold value, and/or transmits the new instance of the augment image 304 to the computing device 200 upon submission of augment request 104, where the augment request 104 further includes an augment ID 305. For example, where a first instance of the augment (e.g., the augment image 104A) associated with an augment marker 300 has already been downloaded (e.g., upon entering the augment zone 102), operation 1204 may transmit a second instance of the augment (e.g., the augment image 104B) that will display instead of or in addition to the first instance of the augment. In operation 1204, determination of the new instance of the augment image 304 for an augment marker 300 may be left until an augment request 104 for the augment marker 300 is generated. In one or more embodiments, as shown in operation 1206, the transmission of operation 1204 may deliver the new instance of the augment image 304 while the computing device 200 is continuously displaying the augment image 304 on the display 202 of the computing device 200. Operation 1208 optionally terminates the augment image 304 on the display 202 of the computing device 200. Operation 1210 may then display the new augment image 304 on the display 202 of the computing device 200. For example, where the augment marker 300 has been printed on one hundred t-shirts circulating at a concert, with the first thousand people to scan a t-shirt winning a prize and each user 101 experiences the augment depending on how many people have previously submitted augment requests 104 associated with the t-shirt, the augment image 104 may slow change based on the number of previous augment requests 104 (e.g., green when 500 remain, yellow when 200 remain, red when 50 remain).

Alternatively, the display limit 519 may be based on augment events. For example, a certain game may begin when enough users 101 are within a certain augment zone 102. Each of instance of the augment marker 300 within the augment zone 102 may have a first augment before enough users 101 are within the augment zone 102 (e.g., an augment that simply projects text that says "More users required, game has not started"), and may be replaced by different augments once enough users 101 enter the augment zone 102.

Figure 15:
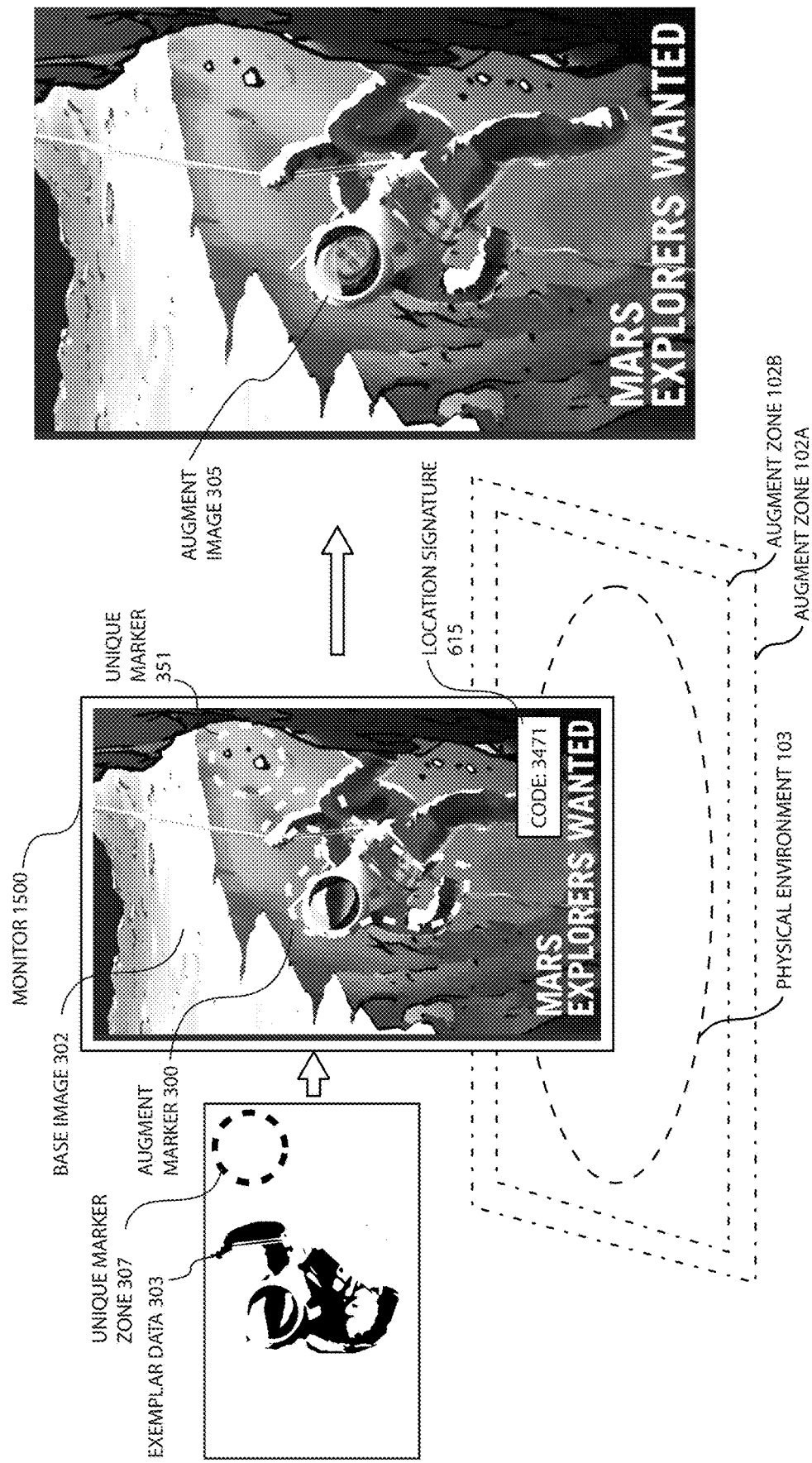
FIG. 15 is an example embodiment illustrating a fictional use of the augment deployment network by a government space organization for an educational campaign and contest across a museum, according to one or more embodiments.

In one or more embodiments, verifying location may be important for the augmented reality deployment and/or its sponsoring organization. In one or more embodiments, one method of location verification is associating an augment marker 300 with a geospatial coordinate 409, then verifying the augment request 104 for the augment marker 300 is within a relatively small distance (e.g., 20 feet, 100 feet) of the geospatial coordinate 409. In one or more embodiments, where there may be several instances of the same instance of the augment marker 300 (e.g., a hundred similar sculptures spread throughout a city), there may be one small unique aspect to each detectable by the marker recognition system 212 and/or the marker recognition system 512 but which may not be noticeable to users 101. In the example of FIG. 3 and FIG. 15, for a visual image, the unique aspect is the unique marker 351. In such case an augment request 104 with a spoofed GPS location purporting to scan an augment marker 300B while really in the presence of the augment marker 300A could be detected.

FIG. 13 is a process flow illustrating enhanced verification of the physical environment 103 of the augment marker 300, which may result in certainty beyond the geospatial verification and/or use of the unique marker 351, the enhanced verification including transmission of an out-of-band location signature 615 to the location authentication device 600 of FIG. 6, according to one or more embodiments. Operation 1300 receives an augment request 104 to initiate and/or present an augment of an augment marker 300. Operation 1302 determines a location authentication device 600 associated with the augment marker 300. For example, the marker ID 301 of the augment marker 300 may have been stored in association within a database (e.g., the location authorization database 520) a geospatial coordinate 509 which may be used to look up the location authentication device 600. In another example, the unique marker 351 may be utilized, as shown in conjunction with the embodiments of FIG. 3 and FIG. 15, which may have an association with the location authentication device 600.

Operation 1304 generates a location signature 615. The location signature 615 is a digital value that can be communicated to the computing device 200 and/or one or more servers of the augment deployment network 120 (e.g., the control server 500) to verify the user 101 is within the physical environment 103 of the augment marker 300. Operation 1306 transmits the location signature 615 over the network 100 out-of-band to the location authentication device 600. The out-of-band communication is transmitted through a first communication channel and/or a first set of network traffic (e.g., over the network 100) distinct from that which the computing device 200 is using to communicate. At this stage, the location signature is transmitted to the computing device 200, either manually (e.g., the user 101 reading it from the display 602) or automatically (e.g., connecting through a Bluetooth communication protocol to the computing device 200 that is nearby). The resulting location signature 615 is referred to as the location signature data 215. Operation 1308 receives the location signature data 215 from the computing device 200 through the network 100. Operation 1310 determines whether the location signature 615 matches the location signature data 215. Where no match is determined, then operation 1310 proceeds to generate an error in operation 1312. Where operation 1310 does determine a match, operation 1310 proceeds to operation 1314, which generates and issues an authorization token 511.

While the embodiment of FIG. 13 illustrates the control server 500 initially generating the location signature 615, alternatively, the location signature 615 may be generated at the location authentication device 600 as long as the location signature 615 is transmitted through a first communication channel and/or a first set of network traffic (e.g., over the network 100) and later received through a different communication channel and/or a different set of network traffic. As a result, a "loop" is formed (what may be known in the art as an authentication token loop). In such case, the location signature 615 generated on the location authentication device 600 may be passed both to the computing device 200 and to the control server 500, then later compared on the control server 500.

In one or more embodiments, the augment marker 300 and the location signature 615 may be presented on common hardware. For example, a monitor in a restaurant may present the augment marker 300 as an image that, when used to initiate an augment request 104, presents the location signature 615 on the corner of the monitor where the user can enter the code before initiating the augment (e.g., the augment image 304).

Figure 14:
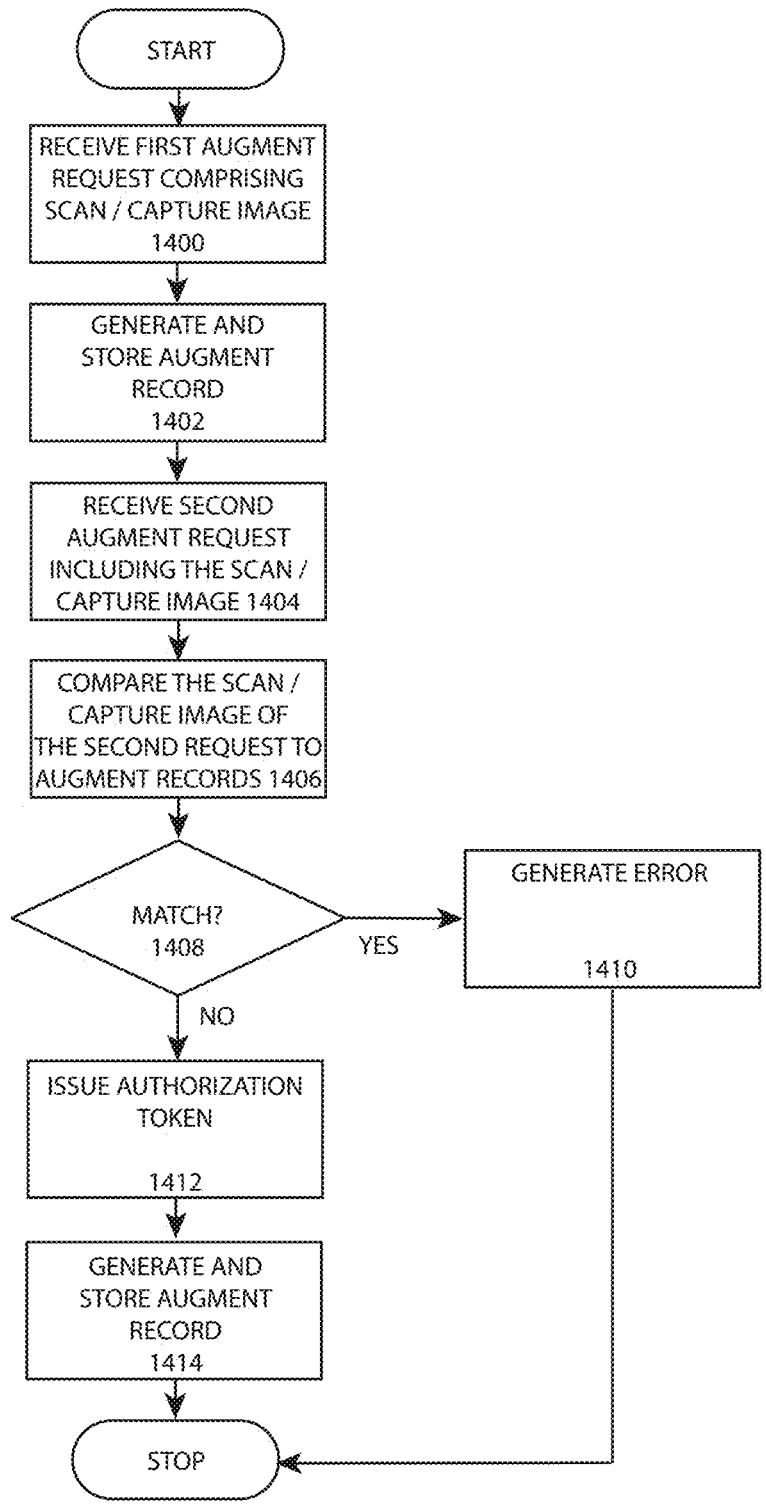
FIG. 14 is a process flow illustrating verification of the augment request through storage and comparison of an instance of the image capture from two or more computing devices before issuance of the authorization token, according to one or more embodiments.

FIG. 14 is a process flow illustrating verification of the augment request 104 through storage and comparison of instance of the image capture 304 from two or more computing devices 200 before issuance of the authorization token 511, according to one or more embodiments. Operation 1400 receives a first augment request 104A comprising a capture data (e.g., a scan data 207 and/or a capture image 205). Operation 1402 generates and stores an augment record 515A for the augment request 104A. The augment record 515A comprises raw and/or filtered data of augment request 104 such that each subsequent instance of the augment request 104 can be compared to determine similarity and/or detect whether certain data may have been utilized to copy, modify and/or falsify data of an augment request 104. Operation 1404 receives a second augment request 104B including a second capture data (e.g., the scan data 207 and/or the capture image 205). Operation 1406 compares the capture data of the first augment request and capture data of the second augment request, for example through image analysis of the capture image 205 of the augment request 104A and the capture image 205 of the augment request 104B.

Operation 1408 determines whether the capture data (e.g., the capture image 205) of the augment request 104A and the capture data (e.g., capture image 205) of the augment request 104B match. Where a match is determined (and/or a substantial match within defined parameters), operation 1408 proceeds to generate an error in operation 1410. Otherwise, operation 1408 proceeds to operation 1412 for generation of the authorization token 511. Operation 1414 the generates and stores an augment record 515, for example as a valid request for future comparisons. In one or more embodiments, however, even rejected instances of the augment request 511 may be stored.

FIG. 15 is an example embodiment illustrating a fictional use of the augment deployment network 120 by a government space organization (e.g., NASA) for an educational campaign across multiple museums (e.g., the Smithsonian), according to one or more embodiments. In conjunction with the embodiment of FIG. 15, a government organization sponsors a STEM (Science Technology, Engineering, and Mathematics) educational event which may be a contest for "top Mars explorer." The organization begins by defining an augment zone 102A in which participants (e.g., users 101) must be present to participate by specifying a geospatial boundary (e.g., as may be stored as the geospatial coordinate data 509) and a larger augment zone 102B that will trigger some actions for the smartphone of a user 101 (e.g., computing device 200) to prepare for entering the competition (e.g., as may be stored as the geospatial coordinate data 409).

Next, the organization defines a number of augment markers 300, such as a replica of the Curiosity rover, the sounds of Marian wind as recorded by a lander probe, and a Mars poster, with the Mars poster distributed in several locations throughout the augment zone 102. Augments are defined for each instance of the augment marker 300, e.g., a graphic of the Martian terrain (e.g., ground, rock, regolith) is projected on the floor of the museum through the display 202 of the smartphone around the Curiosity rover replica, and a portrait photo of a user profile of a user 101's face to be placed on an astronaut's helmet on the poster. Each augment marker 300 includes a physical environment 103. For example, the Curiosity rover replica's physical environment 103 may be an area immediately around it within the exhibit room where the user 101 can stand and capture an image and/or video of the rover, or otherwise detect the augment marker (e.g., a QR code on a educational plaque).

The contest may function like a treasure hunt, such that each user 101 must find several objects and experience the augments association with each to win, with prize size determined by order of completion. The contest may initiate when a set number of users 101 (e.g., 10, 100, 1000) enter the augment zone 102. The first prize may be substantial (e.g., a $10,000 scholarship), whereas other prizes may be modest (e.g., a telescope, a one-year museum membership, etc.). The user 101 may have previously downloaded a smartphone application to permit participation (or be given the option upon entering the museum).

Upon entering the augment zone 102, the smartphone of the user 101 may download relevant augments, including but not limited to from cell phone service (e.g., LTE), satellite internet (e.g., LEO satellite service), and/or from the museum wireless communication network (e.g., Wi-Fi). When a threshold number of users have entered the augment zone 102 and remain present within its boundary, each user may be notified the contest has begun.

A high school student, Jackie, is an avid space enthusiast about to graduate and head off to college. Jackie joins the contents to compete with other high school children for the scholarship. Jackie follows clues to find each one of the augment markers 300 and experience each one of the associated augments. For example, in one museum exhibit a museum visitor can press a button on a plaque to hear the sound of Martian wind as captured by a lander probe. When Jackie presses the button, she holds her smartphone microphone nearby the exhibit's speaker in the exhibit to generate a capture data which is transmitted through the network 100 for detection of the augment marker 300 as part of an augment request 104. A control server 500 verifies that Jackie is one of the registered contest participants and that she is still within the augment zone 104. The control server 500 also compares the capture data generated by Jackie's smartphone with other capture data generated by other students to ensure no two sound files are identical (e.g., there may be slight variation in background noise of each). Upon determination that Jackie's capture data is unique, the control server may issue an authorization token 511 to Jackie's smartphone, and/or transmit the augment image 104 if it was not previously downloaded. As the sound of the Martian wind plays, Jackie's phone shows objects blowing by at the wind speed calculated by the probe to give context and an additional perceptual reference to the rapid wind speed. Similarly, in a different room, upon receipt, the smartphone screen continues to show the Curiosity rover in the display 202, but also overlays the Martian soil where the museum exhibit floor is. Upon confirmation that the augment displayed properly, and/or adequate user interaction occurred showing sufficient engagement with the augment, the augment confirmation data 220 may be generated and passed back to the control server 500. Upon finding all augment markers 300 except for the final augment marker 300, an augment event is triggered that unlocks eligibility to detect and initiate the augment for the final augment marker 300, a "Mars Explorers Wanted" poster located at several locations throughout the museum. In the embodiment of FIG. 15, the poster is a digital poster displayed on a monitor, as "digital" augment marker 300 at each of several locations.

In the embodiment of FIG. 15, the base image 302 of the poster includes the Mars scenery and the lower half of an astronaut. The augment marker 300 is the upper half of the astronaut, which when filtered can be analyzed for a match against a black-and-white exemplar data 303. The unique marker zone 307 is a region where several small falling rocks in the poster can be uniquely re-arranged as the unique marker 351 to distinguish individual posters. In the corner of each monitor displaying the poster, a location signature 615 is displayed to verify the user 101 is within the physical environment 103 of the poster.

Jackie finds the poster and generates a capture image 304. The capture image 304 is displayed to the exemplar data 303 to determine a match. The unique marker 351 and/or Jackie's smartphone's geospatial coordinates are utilized to determine which monitor at the museum she is standing in front of A location signature 615 is then sent to the monitor displaying the digital poster, in this case a simple four-digit number (e.g., "3417"). Jackie is prompted to enter the number on her smartphone and the number is verified (e.g., by the control server 500). The control server 500 issues an authorization token 511 and a display parameter data 517. The augment then initiates, showing Jackie's face in the smartphone app inside the astronaut's helmet (e.g., the image of Jackie's face may be extracted from an image of her user profile an automatically modified (e.g., to fit in a designated location of the helmet through scaling, applying a helmet reflection effect, etc.) and presented in accordance with the display parameter data 517. Jackie wins first prize, and therefore her profile image is uploaded to the delivery server 400 and/or the control server 500 such that any other contestant will see Jackie's image when generating the augment request 104 for the poster but may have their name located in the background plateau depending on if they place in the contest. The exemplar data 303 may be updated to a new instance of the exemplar data 303 to now include Jackie's face which will be displayed on all instances of the poster throughout the museum, such that other computing devices 200 detecting the augment marker 300 may be more likely to have a positive detection.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the computing device 200, the delivery server 400, the control server 500, location authentication device 600). Accordingly, the specification and drawings are to be regarded in an illustrative rather than a restrictive sense. Each of the memories in the present embodiments (e.g., the memory 203, the memory 403, the memory 503, the memory 603) may any medium usable to store computer readable instructions, such as RAM, ROM, solid state memory, a hard disk, a memristor, etc. Each processor of the present embodiments (e.g., the processor 201, the processor 401, the processor 501, the processor 601) is a computer processor such as an Intel® Core i9, Intel® Xeon server processor, QUALCOMM® Snapdragon 855, and/or Apple® A11, etc. Each processor of the present embodiments may have multiple cores and/or utilize distributed parallel processing including but not limited to on commodity computing hardware (e.g., via cloud services).

The structures in the figures such as the engines, routines, and modules may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

What is claimed is:

1. A method of controlling an augmented reality deployment, the method comprising:

delivering an augment image associated with an augment marker, the augment image to be displayed on a display of a computing device comprising at least one of (i) a screen displaying a physical environment of the augment marker, and (ii) a transparency screen through which the physical environment of the augment marker is viewable;

receiving an augment request to display the augment image on the display of the computing device, wherein the augment request generated by the computing device through:

scanning the augment marker with at least one of a camera of the computing device and a scanner of the computing device to generate a capture image of at least one of the augment marker and a scan data, extracts from the computing device a geospatial coordinate data specifying a geospatial coordinate of the computing device;

determining the capture image of at least one of the augment marker and the scan data matches an exemplar data of the augment marker stored in a memory of the computing device, wherein the exemplar data is associated with a marker ID;

receiving at least one of the marker ID, the scan data, and the capture image of the augment marker as data comprising the augment request;

generating a timestamp of the augment request;

determining that a value of a display limit in a database is positive;

initiating a request lock on one of the value; and generating an authorization token in response to determining that:

(i) the geospatial coordinate of the geospatial coordinate data is within a geospatial boundary, (ii) the timestamp of the augment request is within a time range, and (iii) the value of the display limit in the database is positive, wherein the authorization token permitting the computing device to run computer executable instructions that when executed on a processor of the computing device display the augment image on the display of the computing device positioned relative to the augment marker according to a display parameter data.

2. The method of claim 1, further comprising:
receiving an augment confirmation data.

3. The method of claim 2, further comprising:
decrementing the value of the display limit in the database.

4. The method of claim 3, further comprising:
determining that the display limit in the database is below a threshold value;
associating a new instance of the augment image with the marker ID; and
at least one of: (i) transmitting the new instance of the augment image to the computing device automatically upon determining that the display limit in the database is below the threshold value, and (ii) transmitting the new instance of the augment image to the computing device upon submission of the augment request, wherein the augment request further comprising an augment ID.

5. The method of claim 4, further comprising:
delivering the new instance of the augment image while the computing device is continuously displaying the augment image on the display of the computing device;
delivering an augment update instruction specifying termination of the augment image on the display of the computing device and initiating display of the new augment image on the display of the computing device.

6. The method of claim 5, further comprising:
receiving a location signature data generated based on a location signature and generating at least one of a timestamp of a generation of the location signature data and a timestamp of a receipt of the location signature data;
verifying that the location signature data is associated with at least one of the marker ID and a physical location of the augment marker; and
changing the location signature to a new instance of the location signature in response to submission of the location signature data.

7. The method of claim 6, further comprising:
transmitting at least one of the scan data and the capture image of the augment marker as data comprising the augment request; and
storing an augment record comprising at least one of the scan data and the capture image of the augment marker in a request record database;
receiving a second augment request comprising a second instance of the capture image of the augment marker;
comparing the second instance of the capture image of the augment marker to each other instance of the capture image of the augment marker in the request record database;
determining a match between the capture image of the augment marker submitted in the augment request and the capture image of the augment marker submitted in the second instance of the augment request; and
generating an error data.

8. The method of claim 7, further comprising:
receiving a second geospatial coordinate data of the computing device;
at least one of: (i) calculating a geospatial radius around the computing device and determining the augment marker is within the geospatial radius, and (ii) determining the computing device is within an augment zone associated with the augment marker;
determining the augment image associated with the augment marker;
transmitting the augment marker that is at least one of within the geospatial radius and within the augment zone prior to generation of the augment request; and
determining an occurrence of a specified augment event and initiating a second instance of the time range associated with at least one of the marker ID and the augment ID.

9. A method of controlling an augmented reality deployment, the method comprising:
receiving an augment image associated with an augment marker, the augment image to be displayed on a display of a computing device comprising at least one of (i) a screen displaying a physical environment of the augment marker, and (ii) a transparency screen through which the physical environment of the augment marker is viewable;
scanning the augment marker with at least one of a camera of the computing device and a scanner of the computing device to generate a capture image of at least one of the augment marker and a scan data;
determining the capture image of at least one of the augment marker and the scan data matches an exemplar data of the augment marker stored in a memory of the computing device,
wherein the exemplar data is associated with a marker ID;
extracting from the computing device a geospatial coordinate data specifying a geospatial coordinate of the computing device;
submitting an augment request to display the augment image on the display of the computing device;
transmitting at least one of the marker ID, the scan data, and the capture image of the augment marker as data comprising the augment request,
receiving an authorization token generated in response to determining that:
the geospatial coordinate of the geospatial coordinate data is within a geospatial boundary, and
a value of a display limit in a database is positive and initiation on a request lock on one of the value;
positioning the augment image relative to the augment marker on the display of the computing device according to a display parameter data; and
displaying the augment image on the display.

10. The method of claim 9, further comprising:
generating an augment confirmation data that the augment image displayed on the display of the computing device.

11. The method of claim 10, wherein receipt of the augment confirmation data decrements the value of the display limit in the database.

12. The method of claim 11, further comprising:
at least one of: (i) receiving a new instance of the augment image automatically upon determination that the display limit in the database is below a threshold value, and (ii) receiving the new instance of the augment image upon submission of the augment request, wherein the augment request further comprising an augment ID and wherein the new instance of the augment image associated with the marker ID.

13. The method of claim 12, further comprising:
receiving the new instance of the augment image while continuously displaying the augment image;
optionally terminating the augment image on the display of the computing device; and displaying the new augment image on the display of the computing device.

14. The method of claim 13, further comprising:
determining a timestamp of the augment request is within a time range;
capturing a location signature at a physical location of the augment marker and generating a location signature data of the location signature; and
transmitting the location signature data with at least one of the marker ID and the physical location of the augment marker to verify a location of the computing device.

15. The method of claim 14, further comprising:
generating a second augment request comprising a second instance of the capture image of the augment marker, wherein the augment request comprising at least one of the capture image and the scan data, and
wherein an augment record comprising at least one of the capture image and the scan data stored in a request record database;
receiving an error data following comparison of the second instance of the capture image of the augment marker to each other instance of the capture image of the augment marker in the request record database resulting in a determination of a match between the capture image of the augment marker submitted in the augment request and the capture image of the augment marker submitted in the second instance of the augment request.

16. The method of claim 15, further comprising:
generating a second geospatial coordinate data of the computing device within at least one of a geospatial radius and an augment zone; and
receiving from a content delivery network, associated with at least one of the geospatial radius and within the augment zone and prior to generation of the augment request, at least one of: the augment image, the exemplar data of the augment image, the marker ID, the augment ID.

17. A system comprising:
a control server comprising:
  a processor of the control server,
  a memory of the control server,
  a zone detection agent comprising computer readable instructions stored in the memory of the control server that when executed on the processor of the control server:
    receive a geospatial coordinate data of a computing device;
    at least one of: (i) calculate a geospatial distance around the computing device and determining a augment marker is within the geospatial distance, (ii) calculate the geospatial distance around the augment marker and determining the computing device is within the geospatial distance, and (iii) determine the computing device is within an augment zone associated with the augment marker;
    determine an augment image associated with the augment marker; and
    transmit the augment marker that is at least one of within the geospatial distance and within the augment zone at least one of in response to generation of an augment request and prior to generation of the augment request,
  a marker recognition system, comprising computer readable instructions stored in the memory of the control server that when executed on the processor of the control server:
    determine a capture image of at least one of the augment marker and a scan data matches an exemplar data of the augment marker stored in a memory,
      wherein the exemplar data is associated with a marker ID; and
  a request verification module comprising computer readable instructions stored in the memory of the control server that when executed on the processor of the control server:
    generate an authorization token in response to determining that a geospatial coordinate of the geospatial coordinate data is within a geospatial boundary and generate a timestamp of the augment request is within a time range, the authorization token permitting the computing device to run computer executable instructions that when executed on a processor of the computing device display the augment image on a display of the computing device positioned relative to the augment marker according to a display parameter data, and
  a request uniqueness validation routine comprising computer readable instructions stored in the memory of a delivery server that when executed on the processor of the delivery server:
    transmit at least one of the scan data and the capture image of the augment marker as data comprising the augment request;
    store an augment record comprising at least one of the scan data and the capture image of the augment marker in a request record database;
    receive a second augment request comprising a second instance of the capture image of the augment marker;
    compare the second instance of the capture image of the augment marker to each other instance of the capture image of the augment marker in the request record database;
    determine a match between the capture image of the augment marker submitted in the augment request and the capture image of the augment marker submitted in the second instance of the augment request; and
    generate an error data, and
a network.

18. The system of claim 17, further comprising:
the delivery server, comprising:
  a processor of the delivery server,
  a memory of the delivery server,
  an augment delivery engine comprising computer readable instructions stored in the memory of the delivery server that when executed on the processor of the delivery server:
    deliver the augment image associated with the augment marker, the augment image to be displayed on a display of the computing device comprising at least one of (i) a screen displaying a physical environment of the augment marker, and (ii) a transparency screen through which the physical environment of the augment marker is viewable, the zone detection agent comprising computer readable instructions stored in the memory of the delivery server that when executed on the processor of the delivery server:
  receive a second geospatial coordinate data of the computing device;
  determine the computing device is within the augment zone;
  determine the augment image associated with the augment marker; and
  initiate transmission of the augment image that is at least one of within a geospatial radius and within the augment zone prior to generation of the augment request,
an augment transition engine comprising computer readable instructions stored in the memory of the delivery server that when executed on the processor of the delivery server:
  determine that a display limit in a database is below a threshold value;
    associate a new instance of the augment image with the marker ID;
    at least one of: (i) transmit the new instance of the augment image to the computing device automatically upon determining that the display limit in the database is below the threshold value, and (ii) transmit the new instance of the augment image to the computing device upon submission of the augment request, wherein the augment request further comprising an augment ID;
    deliver the new instance of the augment image while the computing device is continuously displaying the augment image on the display of the computing device; and
    deliver an augment update instruction to specify termination of the augment image on the display of the computing device and initiating display of a new augment image on the display of the computing device.

19. The system of claim 18, further comprising:
the computing device, comprising:
  a processor of the computing device,
  a memory of the computing device,
  a geospatial transmission module comprising computer readable instructions stored in the memory of the computing device that when executed on the processor of the computing device:
    transmit the geospatial coordinate data of a set of geospatial coordinates of the computing device, and
  an augment execution engine comprising computer readable instructions stored in the memory of the computing device that when executed on the processor of the computing device:
    display the augment image on the display of the computing device positioned relative to the augment marker according to the display parameter data, and
    generate an augment confirmation data upon display of the augment image on the display of the computing device positioned relative to the augment marker according to the display parameter data.

20. The system of claim 19, further comprising:
a location authentication device comprising:
  a processor of the location authentication device,
  a memory of the location authentication device,
  at least one of (i) a display of the location authentication device for presentation of a location signature within the physical environment of the augment marker and (ii) a wireless communication interface for automatic transmission of the location signature within the physical environment of the augment marker,
the control server, further comprising computer readable instructions stored in the memory of the control server that when executed on the processor of the control server:
  generate the location signature;
  transmit the location signature to the location authentication device through the network;
  receive a location signature data from the computing device;
  at least one of receive a timestamp of a generation of the location signature data and generate a timestamp of a receipt of the location signature data;
  verify that the location signature transmitted to the location authentication device matches the location signature data received from the computing device; and
  initiate generation of a new instance of the location signature in response to submission of the location signature data.

* * * * *